US011485817B2

(12) United States Patent
Salviato et al.

(10) Patent No.: US 11,485,817 B2
(45) Date of Patent: Nov. 1, 2022

(54) RADIATION CURABLE AQUEOUS COMPOSITIONS

(71) Applicant: ALLNEX BELGIUM S.A., Drogenbos (BE)

(72) Inventors: Jean-Yves Salviato, Les Bons Villers (BE); Lieven Depuyt, Grimbergen (BE); Elodie Siband, Brussels (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 107 days.

(21) Appl. No.: 16/638,515

(22) PCT Filed: Sep. 11, 2018

(86) PCT No.: PCT/EP2018/074388
§ 371 (c)(1),
(2) Date: Feb. 12, 2020

(87) PCT Pub. No.: WO2019/052981
PCT Pub. Date: Mar. 21, 2019

(65) Prior Publication Data
US 2021/0122871 A1    Apr. 29, 2021

Related U.S. Application Data

(60) Provisional application No. 62/570,228, filed on Oct. 10, 2017.

(30) Foreign Application Priority Data

Sep. 13, 2017  (EP) .................................... 17190781

(51) Int. Cl.
C08F 2/46     (2006.01)
C08F 2/50     (2006.01)
C08G 61/04    (2006.01)
C08G 18/32    (2006.01)
C08G 18/08    (2006.01)
C08G 18/12    (2006.01)
C08G 18/34    (2006.01)
C08G 18/42    (2006.01)
C08G 18/66    (2006.01)
C08G 18/67    (2006.01)
C08G 18/75    (2006.01)
C09D 175/16   (2006.01)

(52) U.S. Cl.
CPC ..... *C08G 18/3231* (2013.01); *C08G 18/0823* (2013.01); *C08G 18/12* (2013.01); *C08G 18/348* (2013.01); *C08G 18/42* (2013.01); *C08G 18/6659* (2013.01); *C08G 18/673* (2013.01); *C08G 18/755* (2013.01); *C09D 175/16* (2013.01)

(58) Field of Classification Search
CPC .. C08G 18/755; C08G 18/673; C08G 18/227; C08G 18/10; C08G 18/6659; C08G 18/42; C08G 18/12; C08G 18/348; C08G 18/0823; C08G 18/672; C08G 18/3231; C09D 175/16
USPC ........... 522/84, 83, 71, 189, 184, 6, 1; 520/1
See application file for complete search history.

(56) References Cited

U.S. PATENT DOCUMENTS

2003/0055171 A1    3/2003  Overbeek et al.
2010/0144915 A1*   6/2010  Van Casteren ...... C09D 175/08
                                                    522/85
2015/0307738 A1*  10/2015  Schmucker ........ C08G 18/4854
                                                    428/423.1
2017/0096582 A1    4/2017  Tielemans et al.

FOREIGN PATENT DOCUMENTS

EP    2 947 108        11/2015
EP    3 315 521         5/2018
JP    2011-231317      11/2011
WO    03/060017         7/2003
WO    2013/135621       9/2013
WO    2015/092005       6/2015

OTHER PUBLICATIONS

International Search Report (ISR) dated Nov. 20, 2018 in International (PCT) Application No. PCT/EP2018/074388.

* cited by examiner

*Primary Examiner* — Jessica Whiteley
(74) *Attorney, Agent, or Firm* — Wenderoth, Lind & Ponack, L.L.P.

(57) ABSTRACT

Radiation curable aqueous compositions (I) with reduced photo-yellowing are provided. Said composition comprises water, at least one ethylenically unsaturated compound and at least one carboxylic acid hydrazide-containing compound (H) in an amount sufficient to reduce photo-yellowing. Materials of the invention have the advantage that they help to reduce photo-yellowing. They may have a beneficial effect on long term yellowing caused by weathering too. Compositions (I) of the invention allow a better quality control of products and materials just after cure. Materials of the invention can be used to make coatings, inks, paints, varnishes and adhesives and they are further suitable for the making of composites, gel coats, 3D-curing and the making of 3D-objects in general.

18 Claims, No Drawings

RADIATION CURABLE AQUEOUS COMPOSITIONS

The present invention relates to radiation curable aqueous compositions with reduced photo-yellowing, to the processes for making these and to their uses. The materials of the invention are highly suitable for the making of coatings, inks, paints, varnishes (like overprint varnishes), adhesives and UV LED applications with reduced photo-yellowing.

Photo-yellowing that develops in radiation curable coatings just after curing with UV or electron beam (EB) is one of the problems that can limit their use in white or low shade applications. The initial photo-yellowing is at least partially reversible, and will therefore bleach to some extent in the first hours or days after the exposure. Yet, it induces variation in the color of the coating that makes color matching short time after irradiation very difficult, and that therefore also makes online quality control difficult. Reducing this photo-yellowing is an important step in the development of radiation curing technology.

'Photo-yellowing' is also being referred to as 'yellowing on cure' or 'yellowing after cure'. This decrease in time of the yellow color is known as 'bleaching'. This 'photo-yellowing' must be distinguished from 'long term yellowing' which is the yellowing occurring (for almost all coatings) during natural weathering or accelerated aging (like QUV, Xenon, Florida exposures). Usual stabilizers used to prevent this long term yellowing are most generally not effective in preventing photo-yellowing; some of them even are causing themselves photo-yellowing.

THE INVENTION

Against this background we now provide a new type of water based radiation curable materials and compositions that overcome one or more of the problems related to photo-yellowing. We have discovered e.g. that the use of certain hydrazide derivatives permits to avoid—or at least decreases significantly—the photo-yellowing otherwise observed under UV or upon EB exposure.

Hydrazines & hydrazides are intensively used in non-radiation curable coating compositions to protect the coating from UV or thermal degradation (long term yellowing during natural weathering). For instance, decrease of yellowing after prolonged exposure to UV or light is linked in WO 2003/060017 (Bayer) to the use of hydrazines & hydrazides as chain-extender in polyurethanes (PU) and polyurethane dispersions (PUD) that are cured via air-drying or at moderate to high temperatures (through heating) and not by means of UV radiation. In WO 2003/060017, hydrazines and hydrazides are considered to have both a positive effect on long term yellowing of coatings. A reduction of long term yellowing is obtained in JP 2011-321317 by adding to the formulation an adduct that is obtained from the reaction of an isocyanate with an unsymmetrical di-methyl hydrazine.

Hydrazine is also used as crosslinker compound for non-radiation curable polymers. For example, US2003/0055171 describes aqueous coating compositions containing acrylic polymers bearing crosslinker functional groups, especially carbonyl groups, able to provide ambient temperature crosslink of the acrylic polymers in the presence of an external crosslinker, which can be an hydrazine functional group-containing compound.

No mention in either of these documents of any effect on photo-yellowing mainly linked to the radiation cure technology itself.

Aminated compounds including diamines, hydrazines, hydrazides etc, are sometimes used as chain extender in the synthesis of radiation curable polyurethane dispersions (UV-PUD) but impact on photo-yellowing is never mentioned. For example EP 2947 108 A1 describes radiation curable aqueous compositions with controlled polymer flow. A long list of active amino groups-containing compounds (v) is cited to increase the molecular weight of the polyurethanes. EP 3083 736 A describes a radiation curable polyurethane composition comprising soft block made of polyether polyol. Hydrazine hydrate is used as chain extender in the examples and there is no mention of photo yellowing reduction.

Hydrazines, in the context of the present invention were found to be not very useful. They barely impacted photo-yellowing of radiation curable aqueous coating compositions whereas hydrazides had a pronounced effect. Also, not any type of hydrazide was found to work.

BRIEF DESCRIPTION OF THE INVENTION

Against this background we now provide: radiation curable aqueous compositions (I) with reduced photo-yellowing, said composition comprising water, at least one ethylenically unsaturated compound, and at least one carboxylic acid hydrazide-containing compound (H) in an amount sufficient to reduce photo-yellowing. Carboxylic acid hydrazides were found to be highly sufficient in reducing yellowing upon cure in radiation curable water based systems. By a 'reduced' photo-yellowing is meant a photo-yellowing that is reduced by at least 10% compared to a composition that is the same except for the absence of compounds (H)—further referred to as the 'control' composition. By 'an amount sufficient to reduce photo-yellowing' is meant an amount sufficient to reduce photo-yellowing by at least 10% compared to the 'control'.

In the context of the invention, the terms 'photo-yellowing', 'yellowing on cure' and 'yellowing after cure' are used as synonyms and are not to be confused with 'long term yellowing' due to for instance weathering and UV degradation.

In the present invention, by a 'carboxylic acid hydrazide-containing compound' (also referred as (H) compound, including (H1) and (H2) compounds) is meant a compound that contains a carboxylic acid hydrazide in its structure, or preferably, a compound which contains the reaction product of one or more polyisocyanates (see e.g. compounds (i) below) with one or more carboxylic acid hydrazides (see compounds (iv) below). Thus said compound (H) typically contains at least one —C(=O)NH—NH—C(=O)—NH— linkage which is obtained by the reaction of a carboxylic acid hydrazide-containing group with an isocyanate group —NCO. The 'carboxylic acid hydrazide containing-compound' (H) can be provided in the form of an additive and/or in the form of a resin (comprising at least one of the following compounds: polymer(s), co-polymer(s), and/or oligomer(s)). The resin can be oligomeric or polymeric in nature. In an embodiment of the invention, the compound (H) is an additive. In another embodiment of the invention, the compound (H) is a resin that contains carboxylic acid hydrazide-units in its backbone. In a preferred embodiment of the invention, the resin bears one or more 'ethylenically unsaturated groups'. In that scenario, the ethylenically unsaturated compound and the compound (H) are one and the same.

Provided in particular is a radiation curable aqueous composition (I) with reduced photo-yellowing, said composition comprising
water, and
at least one 'saturated' carboxylic acid hydrazide-containing compound (H1) and at least one ethylenically unsaturated compound (EC) and/or
at least one 'ethylenically unsaturated' carboxylic acid hydrazide-containing compound (H2), with compounds (H1) and/or (H2) advantageously being present in an amount sufficient to reduce photo-yellowing. By 'saturated' is meant that the compound (H1) does not bear any ethylenically unsaturated groups, apart from maybe some groups present due to contamination and/or degradation. Compounds (EC) are hence different from compounds (H1) and from compounds (H2). Compounds (EC) typically comprise no units derived from carboxylic acid hydrazides. They contain no carboxylic acid hydrazide in their backbone or structure.

The invention provides one or more of the following:

A radiation curable aqueous composition (I) with reduced photo-yellowing, said composition comprising
water, and
at least one saturated carboxylic acid hydrazide-containing compound (H1) and at least one ethylenically unsaturated compound (EC) and/or
at least one ethylenically unsaturated carboxylic acid hydrazide-containing compound (H2),
wherein the said carboxylic acid hydrazide-containing compound (H1) and/or (H2) is prepared from one or more compound containing free isocyanate groups (i) and from one or more carboxylic acid hydrazide compound (iv) thereby forming a compound (H) containing at least one —C(=O)NH—NH—C(=O)—NH— linkage, The radiation curable aqueous composition as defined above, wherein the carboxylic acid hydrazide-containing compound (H) is provided in the form of an additive and/or in the form of a polymeric resin that, optionally, contains one or more ethylenically unsaturated groups, The radiation curable aqueous composition (I) as defined above, wherein the amount of compounds (H2)+(EC) is at least 50% by weight, relative to the total weight of compounds (H1)+(H2)+(EC) present, The aqueous radiation curable aqueous composition (I) as defined above wherein the ethylenically unsaturated compound (H2) is prepared from:

(i) at least one compound containing free isocyanate groups,
(ii) at least one ethylenically unsaturated compound containing at least one group capable of reacting with an isocyanate and further at least one ethylenically unsaturated group, and
(iv) at least one carboxylic acid hydrazide.

The radiation curable aqueous composition (I) as defined above, wherein the compound (H2) comprises one or more compounds (A1) that is prepared from:

(i) at least one compound containing free isocyanate groups,
(ii) at least one ethylenically unsaturated compound containing at least one group capable of reacting with an isocyanate and further at least one ethylenically unsaturated group,
(iii-1) at least one compound containing at least one group capable of reacting with isocyanate groups and further at least one hydrophilic group capable of rendering the compound (A) dispersible or soluble in water either directly or after the reaction with a neutralizing agent to provide a salt,
(iv) at least one carboxylic acid hydrazide, and
(v) optionally, at least one compound containing at least one group capable of reacting with isocyanate groups but no ethylenically unsaturated groups, The radiation curable aqueous composition (I) as defined above, wherein the compound (H2) comprises one or more compounds (A2) that is prepared from:

(i) at least one compound containing at least two free isocyanate groups,
(ii) at least one ethylenically unsaturated compound containing at least one group capable of reacting with an isocyanate and further at least one ethylenically unsaturated group,
(iii-2) at least one polymer of a Mw higher than 2,000 (preferably more than 5,000) containing at least one group capable of reacting with isocyanate groups and further at least one hydrophilic group capable of rendering the compound (A) dispersible or soluble in water either directly or after the reaction with a neutralizing agent to provide a salt, and
(iii) at least one carboxylic acid hydrazide, The radiation curable aqueous composition (I) as defined above, wherein the compound (H2) comprises one or more compounds (A3) that is prepared from:

(i) at least one compound containing free isocyanate groups,
(ii) at least one ethylenically unsaturated compound containing at least one group capable of reacting with an isocyanate and further at least one ethylenically unsaturated group,
(iii) optionally, at least one compound containing one group capable of reacting with isocyanate groups and further at least one hydrophilic group acting as co-dispersant of the compound (A) in water either directly or after the reaction with a neutralizing agent to provide a salt,
(iv) at least one carboxylic acid hydrazide,
(v) optionally, at least one compound containing at least one group capable of reacting with isocyanate groups but no ethylenically unsaturated groups,
and the radiation curable aqueous composition (I) further comprises at least one external emulsifier (B) and optionally at least one co-solvent (D), The radiation curable aqueous composition (I) as defined above, further comprising at least one external emulsifier (B) and optionally at least one co-solvent (D), The radiation curable aqueous composition as defined above, wherein compound (i) is an aliphatic and/or cycloaliphatic polyisocyanate, The radiation curable aqueous composition as defined above, wherein compound (iv) is selected from hydrazides that have a solubility in demineralized water of at least 2 g/l and/or from hydrazides that have a solubility in basic water of at least 2 g/l, The radiation curable aqueous composition as defined above, wherein compound (iv) is selected from one or more of the group consisting of: adipic acid dihydrazide, sebacic acid dihydrazide, icosanedioic acid dihydrazide, valine dihydrazide and valeric hydrazide, preferably sebacic and/or adipic acid dihydrazide, The radiation curable aqueous composition as defined above, wherein the molar ratio of NH2 groups provided by compounds (iv) over the residual NCO groups obtained after reaction of compounds (i) to (iii) and optionally (v) is more than 0.4, preferably more than 1, The radiation curable aqueous composition as defined above, wherein the amount of carboxylic acid hydrazides (iv) used for the synthesis of compounds (A1), (A2), (A3) or (H1), expressed in % wt of active —NH—NH— groups (Mw 30) relative to the total weight of compounds (A1), (A2), (A3), (H1) and (EC) is higher than 0.2 wt %, The radiation curable aqueous composition (I) as defined above, further comprising at least one ethylenically unsaturated compound (C) different from compounds (H2) and where present (EC), which unsaturated compound (C) is preferably selected from the group consisting of urethane (meth)acrylates, epoxy (meth)acrylates, polyester (meth)acrylates and/or (meth)acrylic (meth)acrylates, and self-water-dispersible polyurethane (meth)acrylate, The radiation curable aqueous composition as defined above, wherein the compound (C) is prepared from the same building blocks as the compound (H2) with the exception that the compound (C) does not contain any compound (iv) building blocks, The radiation curable aqueous composition as defined above, further comprising at least one of the following compounds:
1) At least one photo-initiator,
2) at least one additive that is selected from the group consisting of UV stabilizers and/or UV absorbers, like hindered phenols, hindered amine light stabilizers (HALS) and/or benzotriazoles,
3) at least one hydrazine and/or at least one hydrazide compound different from compounds (H2).

A coating composition, paint, ink, varnish or adhesive prepared from a radiation curable aqueous composition as defined above, A process for preparing a coating with a reduced photo-yellowing, said process comprising the steps of:
(a) providing a radiation curable aqueous composition (I) as defined above,
(b) applying said composition onto a surface to form a dry layer that is from 2 to 200 μm thick, and
(c) irradiating the surface with actinic radiation, The coating obtained via the process as defined above, wherein the photo-yellowing value is below 2, this photo-yellowing value being defined as the difference between the 'b' value according to CIEALAB scale measured 20 minutes before cure and the 'b' value measured 10 minutes after cure for a 25 μm thick dry layer cured with a Hg lamp with an energy of 1,100 mJ/cm$^2$, The use of a radiation curable aqueous composition (I), of a compound (H1) and/or of a compound (H2) as cited above to reduce photo-yellowing of a radiation curable ethylenically unsaturated compound (C) not containing any compounds (iv) in its backbone.

The invention provides radiation curable aqueous compositions (I) with reduced photo-yellowing. Said composition comprises water, at least one ethylenically unsaturated compound and at least one carboxylic acid hydrazide-containing compound (H) in an amount sufficient to reduce photo-yellowing.

Materials of the invention have the advantage that they help to reduce photo-yellowing. They may have a beneficial effect on long term yellowing caused by weathering too.

Compositions (I) of the invention allow a better quality control of products and materials just after cure. Materials of the invention can be used to make coatings, inks, paints, varnishes and adhesives and they are further suitable for the making of composites, gel coats, 3D-curing and the making of 3D-objects in general.

Carboxylic Acid Hydrazide-Containing Compounds (H)

Compounds (H) can be selected from saturated compounds (H1) and/or from unsaturated compounds (H2). Optionally, compound (H) can thus bear one or more 'ethylenically unsaturated groups', like e.g. '(meth)acryloyl' groups. Compounds (H) typically are prepared from (i) one or more carboxylic acid hydrazides and from (ii) one or more 'polyisocyanates' (compounds bearing 2 or more isocyanate groups). Suitable carboxylic acid hydrazides from making compounds (H) are described below, see compounds (Aiv).

The 'polyisocyanate' can be selected from compounds (Ai) as described infra. More typically, however, the 'polyisocyanates' used to prepare compounds (H) are 'oligomers and/or polymers that bear free NCO groups', which themselves are typically obtained from the reaction of an excess of polyisocyanates with compounds bearing one or more groups that are reactive towards isocyanates (like hydroxyl groups). These 'oligomers/polymers containing isocyanates groups' in the present invention are referred to as 'urethane prepolymers'.

Direct reaction of simple polyisocyanates (compounds Ai) with carboxylic acid hydrazides (compounds Aiv) in general results in hard, brittle, insoluble and difficult to handle solids (H) that are not so easy to use.

Preferred, in the context of the invention is the reaction product of carboxylic acid hydrazides with 'urethane prepolymers', resulting in compounds (H) that are much easier to handle. They are more compatible with ethylenically unsaturated oligomers and/or polymers (see e.g. compounds C as described below). They can give rise to polymers with properties that do not affect too much desired properties of the radiation curable resins they are used with, when used in an amount needed to prevent photo-yellowing of these resins. On top of that, such compounds can be emulsified in water, they can be modified in order to have them be self-water-dispersible, or they can be dispersed in aqueous radiation curable compositions. It is possible to use inert resins (H1) and/or ethylenically unsaturated resins (H2).

The best option is to use 'urethane prepolymers' that contain radiation curable reactive groups in order to obtain a modified resin that in itself is radiation curable. Preferred are hence, compounds (H2) that bear one or more ethylenically unsaturated groups, such as (meth)acryloyl groups. This will avoid compatibility issues, problems with migration after cure or a performance decrease coming from the incorporation of an inert resin into a radiation curable aqueous composition.

If a mix of compounds (H) is used, then this mix preferably comprises at least 50% by weight (wt %) of compounds (H2), relative to the total weight of compounds (H) used. In a preferred embodiment of the invention, only compounds (H2) are used.

Compounds (H1) are typically present in an amount from 0.1 to 50 wt %, preferably from 0.5 to 50 wt %, more preferably from 1 to 50 wt %, relative to the solids content of the composition (I) of the invention. For compounds (H2)

the preferred amounts for reducing photo-yellowing (by e.g. at least 10%) are detailed below.

Radiation Curable Water-Based Resins are Preferred Compounds (H)

In the context of the invention, it is preferred to use compounds (H2) that are also named compounds (A). In a preferred embodiment of the invention, the carboxylic acid hydrazide is contained in the backbone of an ethylenically unsaturated compound (A) as further described below.

The at least one ethylenically unsaturated compound (A) typically is prepared from:
(i) at least one compound containing free isocyanate groups,
(ii) at least one ethylenically unsaturated compound containing at least one group capable of reacting with an isocyanate and further at least one ethylenically unsaturated group,
(iii) usually, at least one compound containing one group capable of reacting with isocyanate groups and further at least one hydrophilic group capable of rendering the compound (A) dispersible in water either directly or after the reaction with a neutralizing agent to provide a salt,
(iv) at least one carboxylic acid hydrazide, and
(v) optionally, at least one compound containing at least one group capable of reacting with isocyanate groups but no ethylenically unsaturated groups.

Further possible building blocks of the ethylenically unsaturated compounds (A) are listed below. Their presence depends on the type of compounds (A) being prepared. Details on amount of compounds (A) to use in order to reduce photo-yellowing can be found below, as well as information on preferred amounts of active —NH—NH— groups.

Provided in particular is hence a radiation curable aqueous composition (I) that comprises:
water and
at least one ethylenically unsaturated compound (A) that is prepared from:
(i) at least one compound containing free isocyanate groups,
(ii) at least one ethylenically unsaturated compound containing at least one group capable of reacting with an isocyanate and further at least one ethylenically unsaturated group,
(iv) at least one carboxylic acid hydrazide.

The radiation curable aqueous composition of the invention can be a water-based solution (I-a) or an aqueous dispersion or emulsion (I-b). By a 'water-based solution' is meant that the polymer is mixed with water in a continuous phase (generally clear or slightly turbid). By a 'water-based emulsion or dispersion' is meant a mixture in which the polymers are dispersed as insoluble particles or liquid droplets suspended throughout the water phase. By a 'stable' solution, emulsion or dispersion is meant that a shelf-stability at 20° C. is obtained of at least 24 hours, preferably of at least one month. Preferably a shelf-stability at 60° C. of at least 10 days is obtained.

By an 'ethylenically unsaturated' compound is meant that the compound comprises polymerizable ethylenically unsaturated groups, meaning carbon-carbon double bonds which under the influence of irradiation and/or a (photo) initiator can undergo radical polymerization. The polymerizable ethylenically unsaturated groups are most often chosen from (meth)acrylic and/or from allylic groups. (Meth) acrylic groups are preferred. In the present invention, the term '(meth)acryl*' is to be understood as to encompass both acryl* and methacryl* compounds or derivatives as well as mixtures thereof containing (meth)acryl* group(s). Such (meth)acryl* compounds can be (meth)acryl compounds, also named (meth)acryloyl compounds, or (meth)acrylic compounds also referred as (meth)acrylate compounds. (Meth)acrylic compounds are often preferred. Compounds containing acrylate group(s) are most often preferred.

In general terms, compounds (A) as used herein can be referred to as ethylenically unsaturated polyurethanes. Compounds (A) can be prepared in several ways but typically they are prepared by having a prepolymer bearing free NCO groups react with one or more carboxylic acid hydrazides (compounds iv).

Preferably compounds (A) also named compounds (H2) are chosen amongst one of compounds (A1), (A2) or (A3) as described below.

Radiation Curable Water-Soluble and Water-Dispersible Polyurethanes (A1)

In one embodiment of the invention, compound (A) is a self-water-dispersible compound or a water-soluble compound. The composition (I) of the invention is then typically a radiation curable polyurethane dispersion or solution.

Compounds (A1) are then typically prepared from:
(i) at least one compound containing free isocyanate groups,
(ii) at least one ethylenically unsaturated compound containing at least one group capable of reacting with an isocyanate and further at least one ethylenically unsaturated group,
(iii-1) at least one compound containing at least one group capable of reacting with isocyanate groups and further at least one hydrophilic group capable of rendering the compound (A) dispersible or soluble in water either directly or after the reaction with a neutralizing agent to provide a salt,
(iv) at least one carboxylic acid hydrazide, and
(v) optionally, at least one compound containing at least one group capable of reacting with isocyanate groups but no ethylenically unsaturated groups.

Typically the weight percentages of compounds (i) through (v) sum up to 100%, and most typically weight percentages of compounds (i) through (iv) sum up to 100%.

Most typically compound (A1) is a self-water-dispersible compound, and most typically the composition (I) of the invention is an aqueous polyurethane dispersion.

Water-Based (Meth)Acrylated (Meth)Acrylics (A2)

Compound (A) can also be a water-based ethylenically unsaturated (meth)acrylic, that most typically is a water-based (meth)acrylated (meth)acrylic (A2).

Compounds (A2) typically are prepared from:
(i) at least one compound containing at least two free isocyanate groups,
(ii) at least one ethylenically unsaturated compound containing at least one group capable of reacting with an isocyanate and further at least one ethylenically unsaturated group,
(iii-2) at least one polymer of a weight average molecular weight (Mw) higher than 2,000 (preferably more than 5,000) containing at least one group capable of reacting with isocyanate groups and further at least one hydrophilic group capable of rendering the compound (A) dispersible or soluble in water either directly or after the reaction with a neutralizing agent to provide a salt, and
(iv) at least one carboxylic acid hydrazide.

Typically the weight percentages of compounds (i) through (iv) sum up to 100%. Typically compounds (A2)

have a (meth)acrylic backbone with pending —OH and pending —COOH groups. The pending —OH groups can be introduced into the (meth)acrylic backbone via an OH-bearing (meth)acrylic monomer like e.g. hydroxyl ethyl (meth)acrylate or they can be generated in situ by a ring opening reaction of pending —COOH groups and an epoxide like a glydicidyl ether or ester of versatic acid, see e.g. Cardura™ E10P (available from Hexion).

Radiation Curable Emulsifiable Compounds (A3)

According to a third embodiment of the invention, the composition (I) of the invention is a water-based emulsion that comprises water, at least one ethylenically unsaturated compound (A3) that is not self-water-dispersible or self-water-soluble, and further at least one suitable external emulsifier (B).

By 'external' is meant that a separate compound is used that is not chemically bounded to the compound (A) and that is different therefrom. In one embodiment the external emulsifier (B) is not bearing any ethylenically unsaturated groups, in particular no (meth)acryloyl groups. In another embodiment of the invention, the external emulsifier (B) bears ethylenically unsaturated groups, in particular is a (meth)acrylated compounds bearing one or more (meth)acryloyl groups.

Due to the presence of this external emulsifier (B) in the composition (I), the compound (A3) does not need to have compound (iii) building blocks. In one embodiment of the invention, no compounds (iii) are used to prepare compounds (A3). In another embodiment, some compounds (iii) [any of the above] are used to prepare compounds (A3).

Compounds (A3) are typically prepared from:
(i) at least one compound containing free isocyanate groups,
(ii) at least one ethylenically unsaturated compound containing at least one group capable of reacting with an isocyanate and further at least one ethylenically unsaturated group,
(iii) optionally, at least one compound containing one group capable of reacting with isocyanate groups and further at least one hydrophilic group acting as co-dispersant of the compound (A) in water either directly or after the reaction with a neutralizing agent to provide a salt,
(iv) at least one carboxylic acid hydrazide,
(v) optionally, at least one compound containing at least one group capable of reacting with isocyanate groups but no ethylenically unsaturated groups.

Typically the weight percentages of compounds (i) through (v) sum up to 100%. In particular embodiments the weight percentages of compounds (i) through (iv) sum up to 100%.

By a 'suitable external emulsifier' (B) is meant an emulsifier containing at least one hydrophilic group capable of rendering the compound (A) dispersible or soluble in water either directly or after the reaction with a neutralizing agent to provide a salt. Advantageously compounds (B) are different from compounds (A) and generally they are not (meth)acylated compounds. Suitable emulsifiers are described in e.g. EP 2825603 & EP 16195756.8.

MORE DETAILED DESCRIPTION

Water-based solutions and dispersions can be obtained with any of compounds (A1), (A2) or (A3). Whether a solution or a dispersion is obtained, that depends on the concentration and type of compounds (B) and/or compounds (iii) as used & on the hydrophobicity of the other building blocks (i), (ii), (iv) and (v).

Most typically, compounds (A) are self-water-dispersible. By a 'self-water-dispersible compound' is meant a compound that is insoluble in water yet that itself is capable of being dispersed into water (i.e., without requiring the use of a separate emulsifier or other dispersing aid). A stable dispersion is being formed when the compound is brought into water, or when water is added to the compound. By a stable dispersion is meant that the dispersion has a shelf-stability at 20° C. of at least 24 hours, preferably of at least one month. And, preferably the dispersion has a shelf-stability at 60° C. of at least 10 days. Whether the compound (A) is water-dispersible or not depends on whether and how much of hydrophilic compounds (iii) are used for the preparation of compounds (A)—as well known in the art.

Compounds (A) used in the context of the invention in general are (meth)acrylated compounds and most typically they are acrylated compounds. Typically compounds (A) are (meth)acrylated polyurethanes and more in particular water-dispersible (meth)acrylated polyurethanes.

Most typically compounds (A) of the invention are prepared from no other compounds than compounds (i) through (v) as mentioned. Typically, compounds (i) to (v) all differ from each other.

Compounds (i) typically are polyisocyanates. By a 'polyisocyanate' (i) is meant to designate organic compounds that comprise at least two and typically up to six isocyanate groups. The polyisocyanate compound usually comprises not more than three isocyanate groups. The polyisocyanate compound (i) is most preferably a di-isocyanate. The polyisocyanate compound is generally selected from aliphatic, cycloaliphatic, aromatic and/or heterocyclic polyisocyanates or combinations thereof. Possibly the polyisocyanate (i) contains allophanate groups, biuret and/or isocyanurate groups.

Examples of aliphatic and cycloaliphatic polyisocyanates are 1,5 diisocyanatopentane, 1,6-diisocyanatohexane (HDI), 1,1'-methylene bis[4-isocyanatocyclohexane] (H12MD1), 5-isocyanato-1-isocyanatomethyl-1,3,3-trimethyl-cyclohexane (isophorone diisocyanate, IPDI). Aliphatic polyisocyanates containing more than two isocyanate groups are for example the derivatives of above mentioned diisocyanates like 1,6-diisocyanatohexane biuret and isocyanurate. Examples of aromatic polyisocyanates are 1,4-diisocyanatobenzene (BDI), 2,4-diisocyanatotoluene (2,4-TDI), 2,6-diisocyanatotoluene (2,6-TDI), 1,1'-methylenebis[4-isocyanatobenzene] (MDI), xylylene diisocyanate (XDI), tetramethylxylylene diisocyanate (TMXDI), 1,5-naphtalene diisocyanate (NDI), tolidine diisocyanate (TODI) and p-phenylene diisocyanate (PPDI).

Preferred in the context of the invention are aliphatic and/or cycloaliphatic polyisocyanates, more preferably diisocyanates. Particularly preferred are aliphatic or cycloaliphatic diisocyanates and more in particular cycloaliphatic diisocyanates. Especially preferred are 1,1'-methylene bis[4-isocyanatocyclohexane] (H12MD1) and/or isophorone diisocyanate (IPDI).

The amount of polyisocyanates (i) used for the synthesis of compounds (A) of the invention in general is from 2 to 60 wt %, relative to the total weight of compounds (A). Typically this amount is at least 3 wt % and more typically at least 5 wt %. Typically the amount of compounds (i) is at most 40 wt % and more typically at most 30 wt %, relative to the total weight of compounds (A).

The amount of polyisocyanates (i) used for the synthesis of compounds (A1) of the invention is generally in the range of from 10 to 60 wt % relative to the total weight of the compound (A1). Preferably this amount is in the range of from 10 to 50 wt % and more preferably 20 to 40 wt %.

The amount of polyisocyanates (i) used for the synthesis of compounds (A2) of the invention is generally in the range of from 2 to 60 wt % relative to the total weight of the compound (A2). Preferably this amount is in the range of from 3 to 40 wt % and more preferably 5 to 30 wt %.

Polymerizable ethylenically unsaturated compounds that have one or more reactive groups capable of reacting with isocyanate groups and at least one (meth)acrylic group are preferred compounds (ii). Ethylenic unsaturation (in particular (meth)acrylic groups) can be introduced into the molecules (A) of the invention via side groups (pendant groups), at the terminal ends and/or in the backbone.

Compounds (ii) can be selected from compounds containing one or more ethylenically unsaturated function (such as an acrylic and/or methacrylic group) and preferably two or more nucleophilic functions capable of reacting with an isocyanate (typically a hydroxyl group). Examples of such compounds (ii-a) are polyester (meth)acrylates containing hydroxyl groups, polyether (meth)acrylates containing hydroxyl groups, polyether ester (meth)acrylates containing hydroxyl groups and/or polyepoxy (meth)acrylates containing hydroxyl groups. Acrylates are particularly preferred. They most typically are linear compounds comprising on average 2 hydroxyl groups per molecule. Such compounds are well known in the art. Preferred in this category are polyester (meth)acrylates and/or polyepoxy (meth)acrylates with 2 or more, typically on average 2 hydroxyl groups. Aliphatic compounds are preferred. The use of the di-acrylate of bisphenol A is for instance not recommended.

Particularly preferred compounds (ii-a) are those containing one or more ethylenically unsaturated function (such as acrylic and/or methacrylic group) and essentially one nucleophilic function capable of reacting with an isocyanate (typically a hydroxyl group). Even more preferred are (meth)acryloyl mono-hydroxy compounds, and more in particular poly(meth)acryloyl mono-hydroxy compounds. Acrylates are particularly preferred.

Other compounds may be used. Useful compounds (ii-b) include the esterification products of aliphatic and/or aromatic polyols with (meth)acrylic acid having a residual average hydroxyl functionality of about 1. Aliphatic compounds (ii-b) are preferred. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Preferred are those alkoxylated polyols having not more than three alkoxy groups per hydroxyl functionality and ε-caprolactone-modified polyols. These modified or unmodified polyols are partly esterified with acrylic acid, methacrylic acid or mixtures thereof until the desired residual hydroxyl functionality is reached.

Particularly preferred are compounds comprising at least two (meth)acryl functions such as glycerol diacrylate, trimethylolpropane diacrylate, glycerol diacrylate, pentaerythritol triacrylate, ditrimethylolpropane triacrylate, dipentaerythritol pentaacrylate and their (poly)ethoxylated and/or (poly)propoxylated equivalents (of any of these).

Compounds (ii-b) obtained from the reaction of (meth) acrylic acid with aliphatic, cycloaliphatic or aromatic compounds bearing an epoxy functionality together with at least one (meth)acrylic functionality can be used as well. Compounds obtained from the reaction of an aliphatic, cycloaliphatic or aromatic acid with an epoxy group containing (meth)acrylate, such as glycidyl (meth)acrylate, can also be used.

Other suitable compounds (ii-b) are the (meth)acrylic esters with linear and branched polyols in which at least one hydroxy functionality remains free, like hydroxyalkyl(meth) acrylates having 1 to 20 carbon atoms in the alkyl group. Preferred molecules in this category are hydroxyethyl (meth)acrylate, hydroxypropyl (meth)acrylate, hydroxybutyl (meth)acrylate.

Possibly compounds (i) and (ii) are provided under the form of an adduct (i-ii) having free isocyanate groups. Such adduct can be formed by the reaction of an excess of one or more compounds (i) (any of the above) with one or more compounds (ii) (any of the above). In another embodiment of the invention compounds (i) and (ii) are provided as separate molecules.

The amount of compounds (ii) used for the synthesis of the compounds (A) of the invention is generally in the range of from 15 to 80 wt %, relative to the total weight of the compound (A). Preferably this amount is in the range of from 15 to 70 wt %, from 22 to 70 wt % and more preferably 30 to 60 wt %. For compounds (A1) most often at least 20 wt %, preferably at least 30 wt % and typically at least 40 wt % of compounds (ii) are used. For compounds (A2) most often at least 20 wt %, preferably at least 23 wt % and typically at least 25 wt % of compounds (ii) are used.

Compounds (iii) that may be used in the present invention typically are saturated compounds (iii-a) containing hydrophilic groups capable of rendering the polyurethane dispersible in aqueous medium either directly or after the reaction with a neutralizing agent to provide a salt. Compounds (iii-a) are typically hydroxylated and/or aminated compounds. Typically compounds (iii-a) contain at least one hydroxyl group or at least one primary or secondary amino group, preferably they contain at least two of such hydrophilic groups. In compounds (iii-a) the hydrophilic groups capable of rendering the polyurethane dispersible in aqueous medium can be of ionic and/or of non-ionic nature. Preferably they are of ionic nature, more preferably they are anionic groups, and most preferably they are acidic groups or the salts thereof. Examples of suitable acidic groups include carboxylic acid, sulfonic acid, and/or phoshonic acid groups. Suitable salts are carboxylates, sulfonates and/or phosphonates. Examples of suitable counterions are ammonium, trimethylammonium, triethylammonium, sodium, potassium, lithium and the like. Non-ionic stabilization is often provided by hydrophilic moieties including polyethyleneoxide, polypropyleneoxide, or block copolymers made therefrom. Preferred hydrophilic groups are carboxylic acid groups and the salts thereof. Compounds (iii-a) are therefore typically hydrophilic compounds.

Typically compounds (iii-a) are saturated hydroxycarboxylic acids containing at least one hydroxyl group and at least one carboxylic acid group. In general the number of hydroxyl groups in said compound is at least two and preferably at most three. In general the number of carboxylic acid groups in said compound is at most three. Preferably the hydroxycarboxylic acid in question is a saturated aliphatic hydroxycarboxylic acid having at least one hydroxyl group. Particularly preferred are aliphatic saturated mono-, di- and/or or tri carboxylic acids having at least one hydroxyl group per molecule. Most preferred are the aliphatic saturated mono-carboxylic acids containing at least one, often at least two hydroxyl groups.

Suitable saturated aliphatic hydroxycarboxylic acids (iii-a) are e.g. represented by the general formula (HO)xR (COOH)y, wherein R represents a straight or branched hydrocarbon residue having from 1 to 12 carbon atoms, wherein x is an integer from 1 to 3 and y is an integer from 1 to 3. Typically the sum of x+y is at most 5. Examples of these hydroxycarboxylic acids include citric acid, maleic acid, lactic acid and tartaric acid. Preferred are those hydroxycarboxylic acids wherein y=1 in the above general formula. The most preferred are the α,α-dimethylolalkanoic acids, wherein x=2 and y=1 in the above general formula, such as for example, 2,2-dimethylolpropionic acid and/or 2,2-dimethylolbutanoic acid.

Possibly compounds (iii) are saturated polyester polyols (iii-b) containing compound (iii-a) moieties and/or saturated polycarbonate polyols (iii-c) containing compound (iii-a) moieties. By "moieties" is meant in particular monomer units.

As example of non-ionic compounds (iii-d) we can mention hydroxy-functional compounds bearing non-ionic dispersing groups. The non-ionic dispersing groups can be alkylene oxide groups as described for instance in EP 1328565. Preferred are ethylene oxide groups, but alternatively propylene oxide groups or mixtures of ethylene oxide and propylene oxide groups are useful as well. Preferably the resulting compound (A) has from 5 to 18 wt %, more preferably from 8 to 18 wt % of alkylene oxide groups. Polyethylene glycols are particularly useful for the introduction of hydrophilic non-ionic groups.

Possibly mixtures of two or more types of compounds (iii) are used.

If the aqueous radiation curable composition of the invention is an aqueous dispersion (I-b), then typically compounds (iii) are being used in an amount such that the compound (A) is rendered water-dispersible. The amount of compounds (iii) used for the synthesis of water-dispersible compounds (A) of the invention is generally in the range of from 2 to 25 wt %, relative to the total weight of the compound (A). Preferably this amount is in the range of from 3 to 10 wt % and more preferably 3.5 to 8 wt % when the component (iii) is ionic and preferably this amount is in the range of from 5 to 25 wt % and more preferably 10 to 20 wt % when the component (iii) is non-ionic in nature. These are preferred amounts for compounds (A1) and (A3) For compounds (A2) due to the polymeric nature of compounds (iii-2) these compounds can be used in amounts up to 80 wt %, typically up to 75 wt %, relative to the total weight of the compound (A).

Compounds that are polymeric in nature are typically used to make compounds (A2). Typically these compounds (iii-2) have a Mw higher than 2,000, preferably higher than 5,000 Dalton as measured via GPC. Compounds (iii-2), like compounds (iii-1), contain at least one or group capable of reacting with isocyanate groups and further at least one hydrophilic group capable of rendering the compound (A) dispersible or soluble in water either directly or after the reaction with a neutralizing agent to provide a salt.

Typically but not exclusively, such polymers are based on water dispersible or soluble acrylic and/or epoxy resins. A description of suitable acrylic resins can be found in the WO2012/013488—see the 'waterdispersible (meth)acrylic polymers A' described therein.

Suitable epoxy resins are obtained by reaction of a polyglycidyl with at least one compound containing at least one compound capable to react with glycidyl group and containing at least one hydrophilic groups capable of rendering component (A) dispersible or soluble in water either directly or after the reaction with a neutralizing agent to provide a salt.

Hydrophilic groups can be ionic or non-ionic in nature. Any group that can react with glycidyl can be used. Preferred are compounds bearing primary or secondary amine groups, carboxylic acid groups or hydroxyl groups. Most preferred are carboxylic acid groups or hydroxyl groups. Non-exhaustive examples of hydrophilic compounds that can be used accordingly to this patent are sodium dihydrogen 2-sulphanatosuccinate, sodium 5-sulpho-isophtalate or monosodium 5-Sulpho-isophthalate (SSIP), α,ω-polypropyleneglycol-diamine-sulphopropylated sodium salt, 1,3-diol-2-ethyl-2-polyethylene-polypropyleneglycol sulphonate salt of sodium, polyethylene glycol, polypropyleneglycol and copolymers of the two.

Suitable epoxy resins can also be obtained by reaction of a glycidyl with a stoichiometrical excess of polycarboxylic acid compounds, wherein remaining carboxylic acid groups act as dispersant after neutralization with an alkaline base or a tertiary amine.

The hydrazide (iv) used in the context of the invention most often is a chain extending compound and hence most typically bears at least 2 hydrazide groups, though compounds containing only one hydrazide group can be used as well.

Hydrazides are a class of organic compounds characterized by a nitrogen-nitrogen covalent bond with four substituents with at least one of them being an acyl group. The hydrazide (iv) that is used in the context of the present invention can be selected from mono-hydrazides, di-hydrazides and/or tri-hydrazides. Preferred in the context of the invention are polyhydrazides, or compounds bearing at least 2 hydrazide groups per molecule. Most preferred are di-hydrazides. Even more preferred are aliphatic carboxylic acid hydrazides. Mixtures of aliphatic carboxylic acid hydrazides and aromatic carboxylic acid hydrazides can be used.

By 'carboxylic acid hydrazides' is meant in particular hydrazides that are obtained from the reaction of an excess of hydrazine with a carboxylic acid or the corresponding anhydride, to provide a compound that contains at least one NH2 group capable of reacting with an isocyanate group. The carboxylic acid most typically is a polycarboxylic acid. By 'polycarboxylic acid' is meant a carboxylic acid bearing at least 2 carboxylic acid groups, possibly even 3 or more carboxylic acid groups per molecule. The carboxylic acids and/or corresponding anhydrides which may be used for the formation of these hydrazides may be aliphatic, cycloaliphatic, and/or heterocyclic compounds. Mono- di- and/or tri-acids are preferably used.

Non limitative examples of such carboxylic acids or anhydrides are: valeric or isovaleric acid, stearic acid, hydrogenated fatty acid for the mono-acids; isophthalic acid, glutaric acid, succinic acid, adipic acid, pimelic acid, suberic acid, azelaic acid, sebacic acid, dodecanedioic acid, icosanedioic acid or their corresponding anhydrides for the di-acids; butane tricarboxylic acid for the tri-acids etc. Cyclic acids, polyether containing acids or polyacids from natural origin can also be used like hexahydrophtalic acid, polyethylenglycol diacid, saturated fatty acid dimers or blends of mono, di & trimers (e.g. Pripol from UniQema). Possibly mixtures of the foregoing (any of the forgoing) are used.

Polycarboxylic acid hydrazides based on pre-reacted acids like for example amino acid based valine dihydrazide are also suitable.

Preferably the hydrazide compound (iv) comprises at least one aliphatic carboxylic acid hydrazide and more in particular at least one aliphatic carboxylic acid di-hydrazide.

Particularly suitable compounds (iv) are e.g. adipic acid dihydrazide (ADH), sebacic acid dihydrazide, icosanedioic acid dihydrazide and/or valine dihydrazide. Preferred are adipic acid dihydrazide and/or sebacic acid dihydrazide. Most preferred is adipic acid dihydrazide.

Though aromatic compounds such as e.g. isophthalic di-hydrazide can be used it is preferred to use aliphatic compounds (iv) only, or a mixture of aliphatic and aromatic compounds (iv) with >50 wt. % of aliphatic compounds relative to the total weight of the total of hydrazide containing compounds (iv). Preferably more than 70 w % of aliphatic compounds are used, more typically more than 90 w % of aliphatic compounds are used. Most preferably only aliphatic compounds (iv) are used.

Particularly suitable compounds (iv) are e.g. adipic acid dihydrazide, sebacic acid dihydrazide, icosanedioic acid dihydrazide and/or valine dihydrazide Preferred are adipic acid dihydrazide and/or sebacic acid dihydrazide. Most preferred is adipic acid dihydrazide.

Though aromatic compounds such as e.g. isophthalic di-hydrazide can be used it is preferred to use aliphatic compounds (iv) only, or a mixture of aliphatic and aromatic compounds (iv) with >50 wt % of aliphatic compounds relative to the total weight of the total of hydrazide containing compounds (iv). Preferably more than 70 w % of aliphatic compounds are used, more typically more than 90 w % of aliphatic compounds are used. Most preferably only aliphatic compounds (iv) are used.

Water soluble hydrazides, and more in particular water soluble poly- and/or di-hydrazides are preferred. By 'water soluble' is typically meant herein that the hydrazide has a solubility in demineralized water or in basic water of at least 2 g/l, and more in particular at least 5 g/l. Typically distilled water is used for this kind of testing. The water used for this solubility testing typically has a pH of from 5 to 12. The hydrazide of isophthalic acid for instance has a very low solubility in neutral water with a pH from 6 to 8 but a solubility of more than 5 g/l in an aqueous NaOH solution of 0.01 Mole NaOH/l distilled water.

Compounds (iv) that are used to prepare compounds (A) are selected from hydrazides that have a solubility in demineralized water of at least 2 g/l and/or from hydrazides that have a solubility in basic water of at least 2 g/l. The water used for this solubility testing typically has a pH of from 5 to 12.

The amount of hydrazides (iv) used for the synthesis of compounds (A) according to the invention, expressed in % wt of the active —NH—NH— groups (Mw 30) relative to the total weight of compounds (A) in the composition, is generally in the range of from 0.15 to 5 wt %, more particularly in the range from 0.2 to 5 wt %. Usually this amount is from 0.3 to 2 wt % and more preferably from 0.5 to 1.5 wt %. The total weight of compounds (A) as used herein is the total weight of the compound per se, as calculated from the building blocks, prior to dispersion, emulsion or solution, more in particular it is the solids content (expressed in grams) of the one or more compounds (A) present in the composition (I). If more than one compound (A) is present in the composition, then preferably each of the compounds (A) has a —NH—NH— content as expressed herein.

Typically the amount of —NH—NH— groups as expressed herein is higher than 0.15 wt %, more typically is at least 0.2 wt %. Preferably this content is at least 0.3 wt % and most preferably at least 0.5 wt %. Typically the content of —NH—NH— groups is not higher than 2 wt %, and more generally not higher than 1.5 wt %. Concentrations higher than 2 wt % can be used but mostly without further improvement of the photo-yellowing.

The amount of hydrazides (iv) used for the synthesis of compounds (A) according to the invention, relative to the total weight of the compounds (A), is generally in the range of from 0.4 to 25 wt %. Usually this amount is from 0.8 to 10 wt % and more preferably from 1.3 to 7 wt %.

Optionally, compounds (A) of the invention are further prepared from one or more compounds (v), see for instance compounds (A1) and (A3). Those are compounds that contain at least one group capable of reacting with an isocyanate, but no ethylenically unsaturated groups. Examples include but are not limited to mono-hydric alcohols (compounds with one hydroxyl function), poly-hydric alcohols ('polyols' and often diols), primary and/or secondary amines. Compounds (v) with 2 or more, typically on average 2 functional groups to react with an isocyanate group can act as chain extender. They can be polyols, primary amines and/or amines with secondary amino groups.

Suitable polyols (v-a) of low molecular weight are: ethylene glycol, propylene glycol, 1,3-propanediol, 1,3-butanediol, 1,4-butanediol, 1,5-pentanediol, 1,6-hexanediol, 1,7-heptanediol, 1,8-octanediol, neopentyl glycol, diethylene glycol, dipropylene glycol, triethylene glycol, tetraethylene glycol, dibutylene glycol, 2-methyl-1,3-pentanediol, 2-ethyl-2-butyl-1,3-propanediol, 2-ethyl-1,6-hexanediol, 2,2,4-trimethyl-1,3-pentanediol, 1,4-cyclohexanedimethanol, ethylene oxide adducts or propylene oxide adducts of bisphenol A or hydrogenated bisphenol A, or mixtures thereof (of any of these). Polyols such as glycerol, trimethylolethane, trimethylolpropane, di-trimethylolethane, di-trimethylolpropane and pentaerythritol and/or di-pentaerythritol may also be used. They are examples of low molecular weight polyols.

The polyol can also be selected from high molecular weight polyols (v-b) having a number average molecular weight of at least 400, low molecular weight polyols having a calculated number average weight of lower than 400 or any mixtures thereof. The high molecular weight polyol preferably has a number average molecular weight which does not exceed 5,000, preferably not 2,000, more preferably not 1,000 dalton as calculated based on the hydroxyl index of the polyol. Examples of such high molecular weight polyols are polyester polyols, polyether polyols, polycarbonate polyols, fatty dimer diols, polybutadiene polyols, silicone polyols and polyacrylate polyols, as well as combinations thereof.

Suitable polyether polyols comprise polyethylene glycols, polypropylene glycols and polytetramethylene glycols, or bloc copolymers thereof.

Suitable polycarbonate polyols include the reaction products of diols such as ethylene glycol, 1,3-propanediol, 1,3-butanediol, 1,4-butanediol, 1,5-pentanediol, 1,6-hexanediol, diethylene glycol, triethylene glycol, dipropylene glycol, tripropylene glycol or tetraethylene glycol with phosgene, with dialkylcarbonates such as dimethycarbonate, with diarylcarbonates such as diphenylcarbonate or with cyclic carbonates such as ethylene and/or propylene carbonate.

Suitable fatty dimer diols are obtained from the hydrogenation of dimer acids, preferably those comprising 36 carbon atoms.

Suitable polyacrylate polyols include those prepared by the radical polymerization of (meth)acrylic and/or (meth) acrylamide monomers initiated by a thermal radical initiator in the presence of an hydroxylated mercaptan and followed by the end-group transesterification with a short chain diol, such as 1,4-butanediol.

Preferred are polyester polyols and/or polycarbonate polyols. In a preferred embodiment, the polyol component of the composition according to the invention is free of polyether polyol.

Polyester polyols are particularly preferred, especially the hydroxyl terminated reaction products of polyhydric, preferably dihydric, alcohols with polycarboxylic, preferably dicarboxylic, acids or their corresponding anhydrides, as well as those obtained from the ring opening polymerization of lactones. The polycarboxylic acids which may be used for the formation of these polyester polyols may be aliphatic, cycloaliphatic, aromatic and/or heterocyclic and they may be substituted, saturated or unsaturated. Examples of dicarboxylic acids are succinic acid, glutaric acid, adipic acid, suberic acid, azelaic acid, sebacic acid, dodecanedicarboxylic acid, hexahydrophthalic acid, isophthalic acid, terephthalic acid, ortho-phthalic acid, tetrachlorophthalic acids, 1,5-naphthalenedicarboxylic acid, fumaric acid, maleic acid, itaconic acid, citraconic acid, mesaconic acid, tetrahydrophthalic acid, trimellitic acid, trimesic acid and pyromellitic acid, or mixtures thereof.

The polyester polyol may also contain an air-drying component such as a long chain unsaturated aliphatic acid, especially a fatty acid dimer.

The polyhydric alcohols which are preferably used for the preparation of the polyester polyols are often chosen from one or more compounds (v-a).

Particularly preferred however are polyester polyols made primarily from the polycondensation of (1) isophthalic acid and of (2) adipic acid and/or isophthalic acid.

Possibly a mix of one or more compounds (v-a) and one or more compounds (v-b) is used. Compounds (v) can also be chosen from amines or amino alcohols (v-c) and more in particular from one or more primary or secondary amines. Primary or secondary amines often have an amino functionality from 1 to 6, typically 1 to 4, preferably 1 to 3 and most preferably 1 to 2. Chain extending polyamines typically have an average functionality from 2 to 4, more preferably 2 to 3. The amine (v-c) is suitably a water-soluble aliphatic, alicyclic, aromatic or heterocyclic primary and/or secondary polyamine or hydrazine having up to 60, preferably up to 12 carbon atoms. The total amount of chain extending compounds (v-c) used is generally calculated according to the amount of residual isocyanate groups present in the compound (A) prepolymer. The ratio of isocyanate groups in the prepolymer to the amine groups in the chain extender (v-c) during the chain extension is generally in the range of from about 1:0.3 to about 1:0.9, preferably from about 1:0.5 to about 1:0.7 on an equivalent basis. This ratio is more preferably at most 0.7 in order to have sufficient available NCO group to react with the hydrazide (iv).

Examples of suitable chain extending amines (v-c) include: hydrazine, ethylene diamine, piperazine, 1,4-butanediamine, 1,6-hexanediamine, 1,8-octanediamine, 1,10-decanediamine, 1,12-dodecanediamine, 2-methylpentamethylenediamine, triethylene triamine, isophorone diamine (or 1-amino 3-aminomethyl-3,5,5-trimethyl-cyclohexane), aminoethylethanolamine, polyethylene amines, polyoxyethylene amines and polyoxypropylene amines (e.g. Jeffamines from Huntsman), as well as mixtures thereof (of any of these).

If compounds (v) are used to prepare compounds (A) according to the invention, then they are typically used in an amount in the range of from 1 to 50 wt %, relative to the total weight of the compound (A). Usually this amount is from 2 to 30 wt %, and more preferably from 5 to 25 wt %.

In an embodiment of the invention no compounds (v) are used. In another embodiment one or more compounds (v) are used to prepare compounds (A) of the invention. If chain extenders are used then they most typically are selected from the above mentioned primary and/or secondary amines.

If chain extenders (v) are used then typically the hydrazides (iv) are added only after chain extension, to react with remaining free isocyanate groups. If not, the positive effect of lowering yellowing upon curing may be (partially) lost. And, typically an excess of hydrazides (iv) is used compared to (poly)amines (v) to prevent a preferential reaction with the (poly)amines.

Typically, the molar ratio between the NH2 provided by the Hydrazide (iv) and the residual NCO groups remaining after the reaction between compounds (i) and compounds (ii), (iii) and possibly (v) is more than 0.4, often more than 0.9. This ratio is typically more than 1, preferably more than 1.1. The residual NCO content is typically measured by isocyanate titration with an amine. The amount of NH2 groups is typically obtained by calculation.

Compounds (A) typically are characterized by an amount of copolymerizable ethylenically unsaturated groups of at least 1 meq/g, typically at least 1.5 meq/g, preferably at least 2 meq/g. Typically this amount does not exceed 10 meg/g, more preferably it does not exceed 7 meq/g, and most preferably it does not exceed 5 meq/g.

The amount of ethylenically unsaturated groups is usually measured by nuclear magnetic resonance spectroscopy (NMR) and is expressed in meq per g of solid material. A sample of dry product is dissolved in N-methylpyrolidinone. This sample is submitted to 1H-NMR analysis in order to measure the molar concentration of ethylenically unsaturated groups using 1,3,5-bromobenzene as internal standard. The comparison between the peak assigned to aromatic protons of the internal standard and the peaks assigned to the ethylenically unsaturated double bonds allow to calculate the molar concentration of ethylenically unsaturated groups according to the formula (A×B)/C wherein A is the integration of 1H double bonds provided by the sample, B is the number of moles of the internal standard in the sample and C is the integration of 1H provided by the internal standard.

Alternatively, the amount of ethylenically unsaturated groups can also be measured by a titration method following the addition of an excess of pyridinium sulfate dibromide on said unsaturated groups (within glacial acetic acid as solvent and mercury acetate as catalyst). Said excess liberates iodine in the presence of potassium iodide and the iodine is then titrated with sodium thiosulfate.

Typically compounds (A) have a degree of insaturation that is in the range of from 1 to 10 meq double bonds/g of (A), preferably from 1.5 to 7, and most preferably from to 2 to 5 meq of double bonds/g of (A).

Compounds (A) of the invention are typically provided in the form of an aqueous solution or an aqueous dispersion. Radiation curable aqueous compositions (I) of the invention can be prepared in many ways.

Dispersions (or solutions) in water are typically obtained by a process comprising:

a first step comprising the reaction of compounds (i), (ii), (iii) and (v) in amounts such that a prepolymer is obtained with free NCO groups, optionally, the addition of ethylenically unsaturated compounds (C) different from (A), an optional step comprising the reaction with a neutralizing agent in order to convert the hydrophilic groups provided by compounds (iii) into anionic salts, the dispersion (or solution) in an aqueous medium of said prepolymer, a step in which compounds (iv) are reacted with the pre-polymer to form a compound (A).

The above process is the preferred. In the above, in the first step, compounds (i), (ii), (iii) and (v) are reacted in a one shot or in a multi-stage process (e.g. by reacting first (i) and (iii) and possibly (v) and then a reaction with (ii)). Which of the compounds (i), (ii), (iii) and (v) are used depends on the type of compounds (A) being formed. For instance, water dispersible compounds (A1) are prepared from compounds (i), (ii), (iii-1) and optionally (v). Compounds (A2) are typically prepared from compounds (i), (ii) and (iii-2). Compounds (A2) are typically prepared by reacting a blend of compounds (iii-2) and (ii) with compounds (i). Alternatively one can first react compounds (i) and (ii) followed by a reaction of the adduct formed with compounds (iii-2).

In the above, stochiometry and process are typically designed in such a way that the first step of this process finishes with a large amount of free NCO on the prepolymer, for further reaction with the hydrazide (iv). Typically the isocyanate content of the reaction product of compounds (i), (ii), (iii) and (v) obtained in the first step, as measured by amine titration is in the range between 0.01 and 1 meq/g, preferably between 0.02 and 0.5 meq/g. For compounds (A1) this range is usually from 0.1 to 1 meq/f, more in particular from 0.02 to 0.5 meq/g. For compounds (A2) though this range is usually from 0.01 to 0.05 meq/g, more in particular from 0.02 to 0.03 meq/g.

As mentioned above, typically the molar ratio of NH2 groups provided by compounds (iv) to residual NCO groups obtained after reaction of compounds (i) to (iii) and optionally (v) is more than 0.4, often more than 0.9. Typically this molar ratio is more than 1, preferably more than 1.1. The residual NCO content is typically measured by isocyanate titration with an amine. The amount of NH2 groups is typically obtained by calculation.

The hydrazide (iv) in this process is preferably added after dispersion of the NCO-bearing prepolymer in water, but it can as well be added before dispersion in the step 1 of the process (prepolymer synthesis) or with the (optional) neutralizing agent.

Optionally, the process can further contain a step of chain extension by reaction with compounds (v-c). In this case, the step of chain extension best precedes the step of reaction with compounds (iv) to maximize the beneficial effect on yellowing upon cure. In particular amines tend to react more quickly with NCO groups than hydrazides. In a preferred embodiment, though, no chain extenders (v-c) are being used in the preparation of compounds (A).

Dispersions can be made in two ways. Either water is added to the compounds (A) and where present (B) and (C), or these compounds (A) and where present (B) and (C) are brought into water following by stirring.

This process can be carried out by reacting a stoichiometric excess of compound (i) with compounds (ii), (iii) and possibly compounds (v), preferably under substantially anhydrous conditions and at a temperature between 30° C. and 130° C., more preferably between 70° C. and 100° C., until the reaction between the isocyanate groups and the isocyanate-reactive groups is substantially complete. The isocyanate content can be followed by titration with an amine. The reactants are generally used in proportions corresponding to an equivalent ratio of isocyanate groups provided by compound (i) to isocyanate-reactive groups provided by compounds (ii), (iii) and possibly compounds (v) of from about 1.1:1 to about 2:1, preferably from about 1.4:1 to 1.8:1. For compounds (A2) most often an excess of hydroxyl groups is present (provided basically by compounds iii-2). The reaction is typically stopped before full isocyanate conversion to allow reaction with the carboxylic acid hydrazide. More information on preferred residual isocyanate levels before reaction with the hydrazide(s) can be found infra. The reaction may be facilitated by the addition of 5 to 40%, preferably 15 to 25%, by weight of a solvent in order to reduce the viscosity of the pre-polymer. The solvent is preferably acetone or methylethylketone. During this process, it is common to use catalysts to accelerate the reaction of the isocyanates towards hydroxyls (the NCO reactive group) and to use inhibitors in order to prevent the radical reaction of the reactive unsaturations. It is possible in the frame of this invention to use a sequential process during which (i) with compounds (i), (ii), (iii) and possibly compounds (v) are added incrementally in two or several portions, or with a continuous feed. The reason for this is a better control on the exothermicity of the reaction, especially when no solvent is present.

In general, the pre-polymer obtained after the reaction of (i), (ii), (iii), and possibly (v) is dispersed in an aqueous medium by adding the pre-polymer slowly into water or reversely by adding water to the pre-polymer. Usually this dispersion proceeds under high sheer mixing. Usually the dispersion requires the preliminary neutralization of the hydrophilic groups provided by compound (iii), such as the carboxylic acid or sulfonic acid groups into anionic salts. This is generally done by adding an organic or inorganic neutralizing agent to the pre-polymer or the water. Suitable neutralizing agents include ammonia, volatile organic tertiary amines such as trimethylamine, triethylamine, triisopropylamine, tributylamine, N,N-dimethylcyclohexylamine, N,N-dimethylaniline, N-methylmorpholine, N-methylpiperazine, N-methylpyrrolidine and N-methylpiperidine, low volatile alcohol amines such as dimethylaminoethanol, triethanolamine, dimethylaminoethylpropanolamine and non-volatile inorganic bases comprising monovalent metal cations, preferably alkali metals such as lithium, sodium and potassium and anions such as hydroxides, hydrides, carbonates and bicarbonates. Preferred are triethylamine and sodium hydroxide.

The total amount of these neutralizing agents can be calculated according to the total amount of acid groups to be neutralized. Generally a stoichiometric ratio of about 0.5:1 to 1:1 is used.

The neutralization step can be done before, during or after the step of dispersion in water.

In general, after the formation of the dispersion of the pre-polymer and when it contains a volatile solvent with a boiling point of below 100° C., this solvent is stripped from the polymer dispersion. This is usually done under reduced pressure and at a temperature between 20 and 90° C., preferably 40 to 70° C.

The addition of the ethylenically unsaturated compound (C) can be done before, during or after the dispersion step. When the ethylenically unsaturated compound (C) is a compound comprising no functional groups which are capable of reacting with isocyanate groups, the compound can in addition be added in the first step too. A better dispersion stability is generally obtained when compounds (C) are added before dispersion in water. Compounds (C) typically are different from compounds (A), though most often they are also (meth)acrylated compounds. Compounds (C) are also different from compounds (B) in as far as these would be unsaturated compounds. Compounds (C) are also different from compounds (H2).

The compound (C) is preferably selected from (meth) acrylated compounds (ii-b) as described above and/or from ethylenically unsaturated compounds comprising no functionality which is capable of reacting with an isocyanate group.

Aliphatic and aromatic polyhydric polyols which have been totally esterified with (meth)acrylic acid and contain substantially no residual hydroxyl functionality in the molecule are particularly preferred. Suitable are the esterification products of (meth)acrylic acid with tri-, tetra-, penta- and/or hexahydric polyols and mixtures thereof. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Compounds employed with preference are alkoxylated polyols having no more than two alkoxy groups per hydroxyl functionality, and ε-caprolactone-modified polyols. These modified or unmodified polyols are preferably totally esterified with acrylic acid, methacrylic acid or mixtures thereof until substantially no residual hydroxyl functionality remains. Examples of poly-unsaturated compounds from this category are trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof.

It is also possible to use any compound (C) from the category of urethane (meth)acrylates, epoxy (meth)acrylates, polyester (meth)acrylates and (meth)acrylic (meth) acrylates or mixtures thereof. In a preferred embodiment the compound (C) is a self-water-dispersible polyurethane (meth)acrylate, present in a radiation curable composition comprising at least one compound (A1). A mixture of both can form in situ during the production process of compounds (A1). Typically, the compound (C) is prepared from the same building blocks as the compound (A) with the exception that the compound (C) does not contain any compound (iv) building blocks.

Compounds (C) can be waterborne compounds that are either water-dispersible or water-dilutable. Examples of suitable water-dispersible urethane (meth)acrylates are for instance UCECOAT® 2501, UCECOAT® 7788, UCECOAT® 7655, UCECOAT® 7700 and UCECOAT® 7177. Examples of suitable water-dilutable urethane(meth)acrylates are for instance UCECOAT® 6569, EBECRYL® 2002 and EBECRYL® 11. Examples of suitable epoxy(meth) acrylates include e.g. UCECOAT® 7640. Such compounds are well known in the art and ways to make these are described in various patent applications.

In a preferred embodiment the compound (C) is a self-water-dispersible polyurethane (meth)acrylate, present in a radiation curable composition comprising at least one compound (A1). A mixture of both can form in situ during the production process of compounds (A1). Typically, the compound (C) is prepared from the same building blocks as the compound (A) with the exception that the compound (C) does not contain any compound (iv) building blocks.

Compounds (C) can also be 100% UV compounds that can be added to provide additional properties like e.g. EBECRYL® 1290, DPHA and/or Eb600. If these are added to emulsions then the emulsifier (B) that is used to bring the compound (A-iii) into emulsion most often also suffices to bring this compound (C) into emulsion. If not then an additional emulsifier (B') can be used, for preferred amounts see compounds (B) above. Just by way of an example, an urethane (meth)acrylate like EBECRYL® 1290 can be blended with an acrylic or urethane-based emulsion (I-c) according to the invention. There is two ways of making such blends. Either they are added afterwards or they are added to compounds (A) prior to adding water.

The compound (C) can also be an ethylenically unsaturated compound bearing one or more additional functional groups or side-chains providing additional properties to the polymer. Siliconated and/or fluorinated ethylenically unsaturated compounds such as the products commercialized under the names of IRR 154 and ADDITOL®HGX83 are particularly suitable.

Compounds (C) can be monomeric, oligomeric and/or polymeric ethylenically unsaturated compounds. Polymeric ethylenically unsaturated compounds typically have a calculated Mw that is higher than 1,000, preferably higher than 2,000. Typically compounds (C) are not containing any compound (iv) building blocks.

The amount of ethylenically unsaturated compounds (A) in a radiation curable aqueous composition (I) according to the invention is generally between 20 and 70% by weight, preferably between 30 and 45% by weight, relative to the total weight of the composition.

The amount of ethylenically unsaturated compounds (C) in a radiation curable aqueous composition (I) according to the invention is generally 0 and 30% by weight, preferably between 0 and 10% by weight, relative to the total weight of the composition.

If low yellowing is less of a concern then of course higher amounts of compounds (C) are possible.

Aqueous emulsions can be prepared by blending the reaction product of compounds (i), (ii) and optionally (iii) and/or (v) as described above for compounds (A-3), which reaction product contains free isocyanate groups, with a suitable emulsifier (B) and possibly other ingredients (like co-solvents (D) at a temperature between 20 and 80° C. (preferably below 50° C.) under high shear using for instance a cowless propeller at 20 to 2,000 rpm (depending on the cowless diameter, the vessel diameter and the volume to be stirred). Isocyanate content of the reaction product of compounds (i), (ii) and optionally (iii) and (v), obtained by amine titration is in the range between 0.1 and 1 meq/g, preferably between 0.2 and 0.5 meq/g. Water is added during a period of time of between 5 and 60 minutes at a temperature of between 15° C. and 80° C. (preferably below 50° C.) in such an amount to obtain an aqueous composition with a solid content corresponding to the phase inversion, typically near 80%.

Alternatively, the addition of the organic phase containing the reaction product of compounds (i), (ii) and optionally compounds (iii) and/or (v) as described above for compounds (A-3) is made in water. In this case the emulsifier (B) can be added either to the organic phase or to water, or both. Typically the high shear conditions are maintained for 5 to 60 minutes, after which of water solution containing the compound (iv) at a temperature between 15 to 80° C. is added to dilute the composition to the desired solid content.

Alternatively the ingredients can be added to water but a phase inversion process is usually preferred. Blending at a shear rate of 10 to 200 rpm typically is continued for a period of time between 5 and 30 minutes at a temperature typically of between 15 and 30° C. until a stable emulsion is obtained.

In general compositions of the invention comprise, relative to the total weight of compounds (A-3) and (B), from 50 to 99.9 percent by weight (wt %) of compounds (A-3). Usually this amount is at least 80 wt %, often at least 90 wt %, more often at least 92 wt %. Often this amount is at most 99 wt %, more typically at most 98 wt %, and most typically at most 96 wt %. Typically compositions of the invention comprise, relative to the total weight of compounds (A-3) and (B), from 80 to 99 wt %, preferably from 90 to 98 wt %, most preferably from 92 to 96 wt % of compounds (A-3).

In general compositions of the invention comprise, relative to the total weight of compounds (A-3) and (B), from 0.1 to 50 wt % of compounds (B). Usually this amount is at least 1 wt %, often at least 2 wt %, more often at least 4 wt %. Often this amount is at most 20 wt %, more typically at most 10 wt %, and most typically at most 8 wt %. Typically compositions of the invention comprise, relative to the total weight of compounds (A-3) and (B), from 1 to 20 wt %, preferably from 2 to 10 wt %, more preferably from 4 to 8 wt % of compounds (B).

Compositions (I-b) of this embodiment of the invention typically comprise from 5 to 70 wt % of compounds (A-3), more typically from 55 to 65 wt % relative to the total weight of the composition. Compositions of the invention typically comprise from 0.05 to 35 wt % of compounds (B), more typically from 2 to 6 wt % relative to the total weight of the composition.

The compositions (I-b) of the invention optionally can further comprise at least one co-solvent (D). Preferred are co-solvents that are high boiling solvents, that are capable of reducing the process viscosity and of increasing the colloidal stability of the final emulsion, for instance by modifying the HLB request of the organic phase. Particularly preferred are co-solvents having a boiling point between 100° C. and 300° C., preferably between 150° C. and 250° C., most preferably between 175° C. and 225° C., at 760 mm Hg.

Suitable emulsifiers (B) and co-solvents (D) are for instance those described in EP 2825603 & EP 16195756.8.

Aqueous solutions (I-a) can be prepared in various ways with any of the compositions (A-1) or (A-3). Typically, a blend with water of the reaction product of compounds (i), (ii), (iii) and (v) with optionally a suitable emulsifier (B) and possibly other ingredients (like co-solvents (D) are made at a temperature between 20 to 80° C. under medium to high shear. In these compositions, at least one of compounds (iii) or (B) must be present. Possibly both are present.

The reaction product of compounds (i), (ii), (iii) and (v) contains an excess of isocyanate, typically in the range between 0.1 and 1 meq./g, preferably between 0.2 and 0.5 meq./g, as measured by amine titration.

Water is added during a period of time of between 5 and 60 minutes at a temperature of between 15° C. and 80° C. in such an amount to obtain an aqueous composition with a solid content between 30 and 95%, preferably between 40 and 60%. Water can be equally added to the organic phase or organic phase added to the water. After homogenization, compounds (iv) are added and reaction continues under mixing and stirring for at least 15 minutes.

Alternatively, compounds (iv) can be added to the reaction product of compounds (i), (ii), (iii) and (v) before dispersion in water. Are generally preferred in this process compound (iv) with a NH2 functionality lower than 2, typically 1.

Water-based solution according to the application are water clear to slightly turbid liquid with a viscosity 100 and 10,000 mPa·s (typically between 200-5,000 mPa.$) and a solids content between 20 and 60% (typically between 30 and 50%).

Suitable emulsifiers (B) and co-solvent (D) are for instance those described in EP 2825603 and EP 16195756.8.

Typically compounds (A) of the invention are polymeric or oligomeric compounds.

Typically compounds (A-I) according to the invention have a weight average molecular weight (Mw) of 500 to 20,000 Dalton, preferably from 800 to 10,000 Dalton and most preferably from 1,000 to 5,000 Dalton. Typically compounds (A-II) according to the invention have a weight average molecular weight (Mw) of 5,000 to 200,000 Dalton, preferably from 8,000 to 70,000 Dalton and most preferably from 15,000 to 35,000 Dalton. Typically compounds (A-III) according to the invention will have a weight average molecular weight (Mw) of 300 to 10,000 Dalton, preferably from 500 to 5,000 Dalton and most preferably from 800 to 5,000 Dalton. The weight average molecular weight (Mw) is typically measured by GPC (in THF on a 3×PLgel 5 µm Mixed-D LS 300×7.5 mm column MW range 162 to 377400 g/mol calibrated with polystyrenes standards, at 40° C.).

Radiation curable aqueous dispersions or emulsions generally have a total solid content of from about 30 to 70 wt %, preferably from about 40 to 65 wt %. Typically they have a viscosity measured at 25° C. of less than 1,000 mPa·s, often less than 800 mPa·s, possibly less than 500 mPa·s, even less than 200 mPa·s. In general they have a pH value of 2 to 11, preferably of 4 to 8. For water-based systems based on compounds (A1) and (A2) this value is often from 6 to 11, typically from 6 to 8.5. For water-based systems based on compounds (A3) this value is often from 2 to 6, typically from 2 to 5. Typically the average particle size of aqueous dispersions is from 10 to 1,000 nm, preferably from 30 to 800 nm. For water-based systems based on compounds (A1) this value is often from 30 to 150 nm. For water-based systems based on compounds (A2) this value is often from 50 to 250 nm. For water-based systems based on compounds (A3) this value is often from 300 to 700 nm. The film formation temperature preferably ranges from 0 to 20° C., more preferably from 0 to 5° C.

Radiation curable aqueous solutions generally have a total solids content of from about 30 to 95 wt %, preferably from about 40 to 60 wt %. Typically they have a viscosity measured at 25° C. between 200 and 20,000 mPa s, preferably between 1,000 and 10,000 mPa S. In general they have a pH value of 6 to 11, preferably of 6 to 8.5.

The compositions and processes according to the present invention are advantageous in that they are able to provide radiation curable aqueous compositions with low volatile organic content (VOC), a high solids content, an excellent stability and a low film formation temperature. Depending on the way the resin is incorporated, low viscosity and low to medium particle size dispersions or emulsions, or medium to low viscosity water solutions can be obtained. The compositions of the invention are e.g. stable for at least 10 days at 60° C.

The compositions (I) of the invention may further contain one or more photoinitiators and/or a variety of other additives such as rheology modifiers, thickeners, coalescing agents, antifoam agents, wetting agents, adhesion promoters, flow and leveling agents, biocides, surfactants, stabilizers, anti-oxidants, wax, fillers, matting agents, pigments, dyes and tints.

Other additives that can be added to the composition (I) are additives that further reduce the yellowing upon cure or (alternatively) the long term yellowing.

Examples of additives that help to reduce long term yellowing are standard UV stabilizers and UV absorbers like hindered phenols, phosphites and thioethers, hindered amine light stabilizers (HALS), benzotriazoles etc. Preferred are hindered phenols, hindered amine light stabilizers (HALS) and/or benzotriazoles. Examples of additives that may help to reduce the yellowing upon cure (the photo-yellowing) include but are not limited to e.g. the hydrazines and hydrazides as described in WO 2003/060017.

It may also be beneficial to add certain anti-oxidant like Irganox MD 1024 from BASF. It may also be beneficial to add hydrazines and/or other hydrazides or hydrazide derivatives (different from compounds A or H) like HN130 from Japan Hydrazide.

The radiation curable aqueous compositions (I) according to the invention are preferably cured by ultraviolet irradiation, generally in the presence of a photoinitiator. They can also be cured by electron-beam irradiation, allowing the use of compositions free of photoinitiator. The compositions according to the invention are providing extremely rapid curing. Possible they can also be cured by UV LED and/or HUV.

The photoinitiator preferably is a low- to non-yellowing photoinitiators like Omnirad 1000, Omnirad 481 from IGM, DOUBLECURE 200 from Comindex, Chemcure-73, Chemcure 73-w, Chemcure 481 from Chembridge; Irgacure 184 and Darocure 1173 from IGM. If low migration and/or food packaging are the end use then it may be recommended to use certain polymeric photoinitiators like the Omnipol grades from IGM, Irgacure 2959 from IGM, food-proof thioxanthone photoinitiators etc. In some end applications like inks it may be recommended to use the photoinitiators together with an amine synergist like EBECRYL© P115, EBECRYL© P116, DOUBLECURE 225 etc For UV LED curing it may be recommended to use an UV LED booster like EBECRYL© LED 01, EBECRYL© LED 02, etc.

The radiation curable aqueous compositions (I) according to the present invention can be used for the making of coatings (clear and pigmented, glossy or matte), inks, paints, varnishes (like overprint varnishes) and adhesives. They can further be used for the making of composites, gel coats, 3D-curing and the making of 3D-objects in general (such as 3-dimensional objects made from polyethylene, polypropylene, polycarbonate, polyvinylchloride, optionally pre-coated with other coatings such as polyurethanes).

The present invention therefore also relates to the use of radiation curable compositions (I) for making inks, varnishes (like overprint varnishes), paints, coatings and adhesives and to a process for making inks, varnishes (like overprint varnishes), coatings and adhesives wherein a composition as described here above is used. The present invention also relates to process for preparing a coated substrate or article comprising a step wherein the substrate or article is coated with a radiation curable aqueous composition (I) according to the invention, and preferably, further submitted to curing, particularly under irradiation with UV light (possibly UV LED light) or electron beam (EB). Low energy curing (like UV LED curing and/or HUV curing) are also possible for the radiation curable compositions (I) of the invention. A radiation curable composition is typically a composition which is able to cure trough reaction(s) involving radicals. Such composition although frequently cured by application of radiation can also be cured through other means for example by adding peroxides to the composition, without applying UV or EB radiation.

Further provided is a process for coating, either entirely or in part, an article or substrate with a radiation curable aqueous composition (I) according to the invention, the process comprising the steps of:
(a) providing a radiation curable aqueous composition (I) according to the invention (any of those described above),
(b) applying said composition onto a surface, and
(c) irradiating the surface with actinic radiation.

The present invention also relates to an article or substrate coated or treated with, either partially or entirely, with a radiation curable aqueous composition (I) of the invention. The substrate to be coated or inked can be any substrate, such as wood, metal, paper, plastic, fabric, fiber, ceramic, mineral materials (stone, brick), cement, plaster, glass, leather or leather-like, concrete and already printed or coated materials (e.g. melamine panels, printed paper . . . ) etc. The article can be a 3D article. Preferably articles or substrates are made from wood or plastic.

The coating can be used for industrial applications, but also in graphic applications. Compositions of the invention can be used as primer and/or as topcoat. Compositions of the invention can be used for indoor or outdoor coating.

Radiation curable compositions (I) of the invention can be applied in any possible way like via roller coating, spray application, via inkjet, curtain etc.

The radiation curable aqueous compositions (I) of the invention advantageously have a low photo-yellowing after cure.

This photo-yellowing is typically measured according to CIELAB color space (also known as CIE L*a*b* or sometimes abbreviated as simply "Lab" color space) defined by the International Commission on Illumination (CIE) in 1976. It expresses color using three numerical values, L* for the lightness and a* and b* for the green-red and blue-yellow color components. L, a and b are defined in absolutes values (i.e. without units). CIELAB was designed to be perceptually uniform with respect to human color vision, meaning that the same amount of numerical change in these values corresponds to about the same amount of visually perceived change. The b* axis represents the blue-yellow component, with blue in the negative direction and yellow in the positive direction. Typically, the difference between the 'b' measured before and just after cure is below 3 for a 2 to 25 µm thick dry layer cured with Hg lamp with an energy of 1,100 mJ/cm$^2$. This value is further referred to as the 'delta b' herein after. Preferably the 'delta b' as expressed herein is below 2.5 and most preferably below 2. By 'just after curing' is meant to designate in the present invention maximally 30 minutes after the radiation curing. By 'before cure' is meant to designate in the present invention 5 to 60 minutes before the radiation curing. In the Examples section the 'b' was measured 20 minutes before the UV cure & 10 minutes after the UV cure. The 'delta b' in the Examples was measured with a BYK colorguide instrument. The coating was 25 µm thick unless indicated otherwise.

Typically, photo-yellowing just after cure ('delta b' as expressed herein) is reduced by at least 10% compared to the same composition but prepared from compounds (A') that have no hydrazide (iv) in the backbone. Typically the photo-yellowing ('delta b') is reduced by at least 20%, more typically by at least 25%.

Provided in the invention is therefore also a process for preparing a coating with a reduced photo-yellowing, said process comprising the steps of: the process comprising the steps of:
- (a) providing a radiation curable aqueous composition (I) according to the invention,
- (b) applying said composition onto a surface to form a dry layer of 2 to 200 μm thick, and
- (c) irradiating the surface with actinic radiation, typically by using UV light (possibly by UV LED light) or by using electron beams.

The coating thickness as expressed herein is the thickness of a dry later obtained after flashing off the water. Most typically a layer of 20 to 200 μm is formed.

Typically coatings that are obtained as such have a 'delta b' as expressed herein that is below 3, more particularly below 2.5 and most preferably below 2. Values presented herein are for a 2 to 25 μm thick dry layer that is cured with a Hg lamp with an energy of 1.100 mJ/cm². Prior to UV curing water was flashed off by a drying step of 10 minutes at 50° C.

Radiation curable aqueous compositions of the invention can be used in white or low shade applications. They can be used in inks or in coating compositions that have light colors like white, light blue, light yellow etc. They can also be used for the coating of light substrates where photo-yellowing otherwise can be troublesome like wood, plastic, metal, paper, fabric, fiber, ceramic, concrete, plaster, glass, leather or leather-like, concrete and already printed or coated materials (e.g. melamine panels, printed paper . . . ) etc.

Yet another aspect of the invention relates to the use of a radiation curable aqueous composition (I), of a compound (H) and/or of a compound (A) (any of those described above) to reduce photo-yellowing of radiation curable ethylenically unsaturated compound (C) not containing any compounds (iv) in its backbone. A particular aspect of the invention concerns the use of a composition (I) or of a compound (A) as described herein to reduce photo-yellowing of a water-based resin containing no carboxylic acid hydrazide in its backbone. Preferably photo-yellowing is reduced by at least 10%, more preferably at least 15% compared to the control (not having any compounds H).

This can be done via a simple blending of two aqueous compositions, a composition (I) of the invention and another water based composition, or by adding one prepolymer during the synthesis of the other, prior to dispersion in water. Yet another example, at least one compound (A-iii) can be added to another water-based compound, for instance a water-dispersible urethane (meth)acrylate, prior to dispersion of the latter in water. The non-modified radiation curable water-dispersible compound in this embodiment can possibly act as a co-dispersant or emulsifier (B) for the compounds (A-iii). In this embodiment, where compounds (A) are typically present in relatively low amounts (e.g. from 1 to 15 wt % relative to the total weight of the composition, it is recommended to use compounds (A) with a high amount of carboxylic acid hydrazides contained in the backbone.

Advantageously, the radiation curable aqueous compositions of the invention are also capable of reducing long term yellowing, in particular when they are used in combination with the standard UV stabilizers and UV absorbers like hindered phenols, HALS, benzotriazoles etc.

The examples which will follow illustrate the invention without limiting it.

Conditions of Evaluation of the Yellowing after Cure

All the evaluations have been made in the following conditions:

substrate: Raypaul powder coated (white) Al panel
application: bar coater
film thickness: 1 mil (+−0.1) or the thickness mentioned in the report
drying condition: 10° @ 50° c.
curing condition: 1,100 mj/cm2 (Hg lamp)
Color measurement method:
made with BYK colorguide
conditions 45°/0°, 11 mm, illuminant: d65/10° cat #6800, ser #872144

Definition of the Δb
Δb=b2−b1 wherein
b1 is the b* measured 20 minutes before the cure with UV
b2 is the b* measured 10 min after the UV cure

EXAMPLES

Preparation Example 1

A double-wall glass reactor equipped with a mechanical stirrer, a thermocouple, a vapor condenser and a dropping funnel was charged at 40° C. under air-sparging with 409.5.0 g of Isophorone diisocyanate (IPDI), 1.30 g Butylated hydroxytoluene (BHT), 340 g of acetone, 1023.6 g of polyadipate of neopentylglycol (IOH 58) and 97.16 g dimethylolpropionic acid (DMPA). The reaction mixture was completely homogenized and 1.00 g of Bismuth decanoate is added. The mixture was heated to 60° C. and reacted under reflux for 4 hours. A NCO titer of 0.66 meq/g is obtained. The temperature was decreased to 50° C. and 693.0 g of a mixture of dipentaerythritol penta & hexa acrylate (DPHA) with an IOH of 59.6 was added to the mixture. The temperature was increased to 75° C. and the mixture was maturated 6 hours. The prepolymer obtained had a viscosity of 4.5 Pa·s at 60° C., a solids content of 85.2% and a residual NCO content of 0.161 meq./g (value measured the day after synthesis).

Preparation Example 2

A double-wall glass reactor equipped with a mechanical stirrer, a thermocouple, a vapor condenser and a dropping funnel was charged at 40° C. under air-sparging with 341.6 g of Isophorone diisocyanate (IPDI), 0.90 g Butylated hydroxytoluene (BHT), 202 g of acetone, 753.5 g of polyadipate of neopentylglycol (IOH 58) and 79.54 g dimethylolpropionic acid (DMPA). The reaction mixture was completely homogenized and 0.90 g of Bismuth decanoate is added. The mixture was heated to 60° C. and reacted under reflux for 4 hours. A NCO titer of 0.84 meq/g was obtained. The temperature was decreased to 50° C. and 641.3 g of a mixture of dipentaerythritol penta & hexa acrylate with a IOH of 59.6 is added to the mixture. The temperature was increased to 75° C. and the mixture was maturated 6 hours. The prepolymer was further diluted with 40 g acetone. The prepolymer obtained has a viscosity of 6.6 Pa·s at 60° C., a solids content of 90.1% and a residual NCO content of 0.228 meq./g (value measured the day after synthesis).

Example 1

212 g of a water solution of 3.98 g of sodium hydroxide was added in 10 minutes to 501.4 g of the prepolymer of Preparation Example 1 pre-heated at 60° C. Phase inversion was obtained by further addition of 386 g of demineralized water followed immediately by the addition of solution of 5.62 g of Adipic acid dihydrazide in 65 g of water. 0.5 g of BYK093 antifoaming agent was added to the dispersion and acetone was stripped under vacuum at a T° of 50-55° C. until a residual of acetone content below 0.05% was obtained. Further 30 g of water are added in order to obtain a solids content near 40%.

Equivalent ratio between NH2 and residual NCO was 0.8 in this example.

Example 2

212 g of a water solution of 3.98 g of sodium hydroxide and 7.73 g of adipic acid dihydrazide was added in 10 minutes to 501.4 g of the prepolymer of preparation example 1 pre-heated at 60° C. Phase inversion was obtained by further addition of 449 g of demineralized water. 0.5 g of BYK093 antifoaming agent was added to the dispersion and acetone was stripped under vacuum at a T° of 50-55° C. until a residual of acetone content below 0.05% was obtained. Further 30 g of water were added in order to obtain 40% solids.

Equivalent ratio between NH2 and residual NCO was 1.1 in this example.

Example 3

Same recipe as in Example 2, but with the adipic acid di-hydrazide quantity increased to 9.62 g.

Equivalent ratio between NH2 and residual NCO was 1.3 in this example.

Comparative Example 4-R

Same recipe as in Example 1, but here adipic acid di-hydrazide was replaced by 2.40 g of propylenediamine.

Equivalent ratio between NH2 and residual NCO was 0.8 in this example.

Comparative Example 5-R 10.53 g of triethylamine was added to 505 g of the prepolymer of Preparation Example 1 pre-heated at 60° C. and homogenized for 15 minutes. Phase inversion was obtained by addition of 682 g of demineralized water added in 20 minutes. 0.5 g of BYK093 antifoaming agent was added to the dispersion and acetone was stripped under vacuum at a T° of 50-55° C. until a residual of acetone content below 0.05% was obtained.

No amine or hydrazide was added in this example.

Comparative Example 6-R

As further counter example the radiation curable aqueous composition of Example 2 of the patent WO2012-013488 A1. Again, this was an UV PUD not made according to the invention.

Example 7

324 g of a water solution of 5.77 g of sodium hydroxide and 14.89 g of adipic acid dihydrazide was added in 10 minutes to 700 g of the prepolymer of Preparation Example 2 pre-heated at 60° C. Phase inversion was obtained by further addition of 621 g of demineralized water. 0.7 g of BYK093 antifoaming agent was added to the dispersion and acetone was stripped under vacuum at a T° of 50-55° C. until a residual of acetone content below 0.05% was obtained.

Equivalent ratio between NH2 and residual NCO was 1.07 in this example.

Example 8

Made with the same recipe as example 7 but with the adipic acid dihydrazide replaced by 16.59 g of Isophtalic acid dihydrazide.

Equivalent ratio between NH2 and residual NCO was 1.07 in this example.

Comparative Example 9-R

Made with the same recipe as example 7, but with the adipic acid dihydrazide replaced by 7.70 g of carbo dihydrazide (from Sigma-Aldrich).

Equivalent ratio between NH2 and residual NCO was 1.07 in this example.

Comparative Example 10-R

Made with the same recipe as example 7, but here the adipic acid dihydrazide was replaced by 18.2 g of 15% solution in water of hydrazine.

Equivalent ratio between NH2 and residual NCO was 1.07 in this example.

Results obtained with the above Examples and Comparative Examples are summarized in Tables 1-4 below. Amounts are in grams unless specified otherwise.

TABLE 1

Main characteristic of the examples and comparative examples—First series

| | Ex1 | Ex2 | Ex3 | Ex4-R | Ex5-R | Ex6-R |
|---|---|---|---|---|---|---|
| Hydrazide or amine | ADH | ADH | ADH | PDA | none | none |
| NH2/NCO | 0.8 | 1.1 | 1.3 | 0.8 | — | — |
| % NHNH groups * | 0.45 | 0.61 | 0.76 | 0 | 0 | 0 |
| Viscosity at 25° C. (mPa · s) | 112 | 101 | 53 | 315 | 427 | 303 |
| % solids | 39.5 | 40.6 | 39.9 | 40.0 | 38.9 | 41.2 |
| pH | 7.27 | 7.16 | 7.35 | 7.41 | 7.53 | 7.40 |
| Particle size (nm) | 77 | 75 | 65 | 80 | 69 | 98 |

* relative to the total weight of compounds (A), prior to dispersion, emulsion or solution

TABLE 2

Photo yellowing (Δb = b before cure − b just after cure)—First series

| Δb at various thickness | Ex1 | Ex2 | Ex3 | Ex4-R | Ex5-R | Ex6-R |
|---|---|---|---|---|---|---|
| 0.63 +− 0.20 mil | 1.43 | 1.25 | 1.01 | 1.85 | 2.02 | 2.67 |
| 1.13 +− 0.36 mil | 1.53 | 1.30 | 1.01 | 2.05 | 2.30 | 3.27 |

The above Table shows that UV PUD's according to the invention that were prepared from carboxylic acid hydrazides (compounds iv) have a much lower yellowing after cure. The higher the concentration of hydrazide, the lower the photo-yellowing. When the hydrazide was replaced by a diamine (Comparative Example 4-R), there was no such effect.

A second series of Examples and Comparative Examples was prepared. Results are summarized in Tables 3 and 4 below:

TABLE 3

Main characteristic of the Examples and the Comparative Examples - Second series

|  | Ex7 | Ex8 | Ex9-R | Ex10-R |
|---|---|---|---|---|
| Amine/Hydrazide | ADH | IDH | CDH | $N_2H_4$ |
| NH2/NCO | 1.07 | 1.07 | 1.07 | 1.07 |
| % NHNH groups | 0.79 | 0.79 | 0.79 | 0.80 |
| Viscosity at 25° C. (mPa · s) | 37 | 70 | 47 | 44 |
| % solids | 39.8 | 40.5 | 39.6 | 39.8 |
| pH | 7.29 | 7.50 | 7.45 | 7.38 |
| Particle size (nm) | 65 | 54 | 55 | 68 |

TABLE 4

Photo yellowing (Δb = b before cure − b just after cure) - Second series

| Δb at 1 mil thickness | Ex7 | Ex8 | Ex9-R | Ex10-R |
|---|---|---|---|---|
| 1.13 +− 0.36 mil | 1.5 | 2.5 | 3.9 | 2.7 |

The above Table shows that the incorporation of a carbohydrazide (Example 9-R) did not have the desired effect whereas the incorporation of a carboxy acid hydrazide (a compound (iv) according to the claims) significantly reduced photo-yellowing. Also hydrazine (Example 8-R) proved less suitable on general.

Comparative Examples 11-R and Example 12

Preparation Example 3 (for Examples 11-R and 12)

A pressurized reactor equipped with a mechanical stirrer and a thermocouple was charged with 56.6 g Cardura™ E10P (Hexion) and 24 g Methyl Ethyl Ketone (MEK). After inertization with nitrogen, reactor was heated to 160-165° C. A pressure of 2-2.5 bar was reached inside the reactor. In parallel a solution of monomers containing 218.86 g methyl methacrylate, 64.16 g Butyl acrylate and 37.74 g acrylic acid and a solution of initiator with 5.7 g Di-t-Butyl peroxid and 20 g MEK are prepared. Both mixtures are fed into the reactor in parallel within 5-6 h. At the end of the addition, the monomers and initiators pipes were rinsed with 10 g MEK. Polymer mixture was then matured 2 h, cooled down to 90° C. and diluted with 156 g MEK.

The prepolymer thus prepared had the following characteristics. Measuring methods are given between brackets.
Hydroxyl value IOH: 47 mg KOH/g (DIN EN ISO 4629)
Acid value AN: 44.1 mg KOH/g (DIN EN ISO 2114)
Viscosity: 870 mPas (DIN EN ISO 3219, 25 1/s; 23° C.)
Mw: 8 400 g/mol (measured via GPC as mentioned infra)
Non-volatile matter: 64.4 wt %
(solids content)—(DIN EN ISO 3251, 1 h drying of a 2 g sample in an oven at 125° C.)

Comparative Example 11-R—No Compound (iv)

A double-wall glass reactor equipped with a mechanical stirrer, a thermocouple, a vapor condenser and a dropping funnel was charged at 40° C. under air-sparge with 543 g polymer 1 above, 0.58 g Butylated hydroxytoluene (BHT) and 116.6 g of a mixture of dipentaerythritol penta & hexa acrylate (DPHA) with a IOH of 59.6. When the reaction mixture was completely homogenized 0.56 g of Bismuth noedecanoate was added. After 10 minutes 27.7 g isophoronediisocynate (IPDI) was charged into the reactor. The mixture was heated to 80° C. and reacted under reflux for 6-8 hours. The prepolymer obtained had a residual NCO of 0.005 meq NCO/g.

28.1 g of sodium hydroxide solution at 30% was added in 10 minutes to the prepolymer of preparation example 3 pre-heated at 65° C. Phase inversion was obtained by further addition of 834 g of demineralized water. MEK was stripped under vacuum at a T° of 65-70° C. until a residual of MEK content below 0.05 wt % was obtained. Dispersion obtained was translucent, had a viscosity of 18 mPas, a solid content of 39.8 wt % and particle size of 56 nm.

Example 12

A double-wall glass reactor equipped with a mechanical stirrer, a thermocouple, a vapor condenser and a dropping funnel was charged at 40° C. under air-sparge with 543 g polymer 1, 0.58 g Butylated hydroxytoluene (BHT) and 116.6 g of a mixture of dipentaerythritol penta & hexa acrylate with a IOH of 59.6. When the reaction mixture was completely homogenized 0.56 g of Bismuth noedecanoate was added. After 10 minutes 27.7 g isophoronediisocyanate (IPDI) was charged into the reactor. The mixture was heated to 80° C. and reacted under reflux for 6-8 hours. The prepolymer obtained has a residual NCO content of 0.019 meq NCO/g.

144.6 g of a water solution of 8.4 g of sodium hydroxide and 13.9 g of adipic acid dihydrazide (ADH) was added in 10 minutes to the prepolymer of Preparation Example 3 pre-heated at 65° C. Phase inversion was obtained by further addition of 688.4 g of demineralized water. MEK was stripped under vacuum at a T° of 65-70° C. until a residual of MEK content below 0.05 wt % was obtained. Dispersion obtained was translucent, had a viscosity of 16 mPas, a solid content of 40.2 wt % and particle size of 61 nm.

TABLE 5

Main QC characteristic of the examples and comparative examples - acrylated acrylic (A-2)

|  | Ex 11-R | Ex 12 |
|---|---|---|
| Hydrazide | none | ADH |
| % NH—NH groups | 0 | 1.33 |
| Viscosity at 25° C. (mPa · s) | 18 | 16 |
| % solids | 39.8 | 40.2 |
| pH | 8.0 | 8.0 |
| Particle size (nm) | 56 | 61 |

TABLE 6

Photo yellowing (b before cure − b just after cure) - Acrylated acrylic (A-2)

| Δb at 1 mil thickness | Ex11-R | Ex 12 |
|---|---|---|
|  | 2.4 | 1.9 |

The above Table shows that incorporation of ADH (adipic acid hydrazide, a compound (iv) according to the claims) also decrease the photo-yellowing of water-based (meth) acrylated (meth) acrylics.

Examples 13-15 and Comparative Examples 16-R-17-R

Preparation Example 4

A double-wall glass reactor equipped with a mechanical stirrer, a thermocouple, a vapor condenser and a dropping funnel was charged at 40° C. under air-sparging with 613.1 g of Isophorone diisocyanate (IPDI), 1.60 g Butylated hydroxytoluene (BHT), 355 g of acetone, 954.3 g of polyadipate of neopentylglycol (IOH 58) and 139.44 g dimethylolpropionic acid (DMPA). The reaction mixture was completely homogenized and 0.90 g of Bismuth decanoate was added. The mixture was heated to 60° C. and reacted under reflux for 4 hours. A NCO titer of 0.95 meq./g was obtained. The temperature was decreased to 50° C. and 1484.4 g of a mixture of dipentaerythritol penta & hexa acrylate with a global IOH of 59.6 was added to the mixture. The temperature was increased to 75° C. and the mixture was maturated 6 hours. The prepolymer was further diluted with 40 g acetone. The prepolymer obtained had a viscosity of 5.6 Pa·s at 60° C., a solids content of 89.8% and a residual content of 0.242 meq. NCO/g (value measured the day after synthesis).

Example 13

324 g of a water solution of 6.10 g of sodium hydroxide and 15.57 g of Adipic acid dihydrazide was added in 10 minutes to 700 g of the prepolymer of preparation example 4 pre-heated at 60° C. Phase inversion was obtained by further addition of 575 g of demineralized water. 0.44 g of BYK093 antifoaming agent was added to the dispersion and acetone was stripped under vacuum at a T° of 50-55° C. until a residual of acetone content below 0.05% was obtained.

Equivalent ratio between NH2 and residual NCO was 1.14 in this example.

Example 14

320 g of a water solution of 6.10 g of sodium hydroxide and 8.91 g of Adipic acid dihydrazide was added in 10 minutes to 700 g of the prepolymer of preparation example 4 pre-heated at 60° C. Phase inversion was obtained by further addition of 575 g of demineralized water. 0.44 g of BYK093 antifoaming agent was added to the dispersion and acetone was stripped under vacuum at a T° of 50-55° C. until a residual of acetone content below 0.05% was obtained.

Equivalent ratio between NH2 and residual NCO was 0.65 in this example.

Example 15

315 g of a water solution of 6.10 g of sodium hydroxide and 5.88 g of Adipic acid dihydrazide was added in 10 minutes to 700 g of the prepolymer of preparation example 4 pre-heated at 60° C. Phase inversion was obtained by further addition of 575 g of demineralized water. 0.44 g of BYK093 antifoaming agent was added to the dispersion and acetone was stripped under vacuum at a T° of 50-55° C. until a residual of acetone content below 0.05% was obtained.

Equivalent ratio between NH2 and residual NCO was 0.43 in this example.

Example 16-R (Variable Results)

312 g of a water solution of 6.10 g of sodium hydroxide and 2.84 g of Adipic acid dihydrazide was added in 10 minutes to 700 g of the prepolymer of preparation example 4 pre-heated at 60° C. Phase inversion was obtained by further addition of 575 g of demineralized water. 0.44 g of BYK093 antifoaming agent was added to the dispersion and acetone was stripped under vacuum at a T° of 50-55° C. until a residual of acetone content below 0.05% was obtained.

Equivalent ratio between NH2 and residual NCO was 0.17 in this example

Comparative Example 17-R 308 g of a water solution of 6.10 g of sodium hydroxide was added in 10 minutes to 700 g of the prepolymer of preparation example 4 pre-heated at 60° C. Phase inversion was obtained by further addition of 575 g of demineralized water. 0.44 g of BYK093 antifoaming agent was added to the dispersion and acetone was stripped under vacuum at a T° of 50-55° C. until a residual of acetone content below 0.05% was obtained.

No amine or hydrazide was added in this example

Results are summarized in Tables 7 and 8 below:

TABLE 7

Main characteristic of the Examples and the Comparative Examples - Fourth series

|  | Ex13 | Ex14 | Ex15 | Ex16 | Ex17-R |
|---|---|---|---|---|---|
| Hydrazide | 2.6% | 1.5% | 1.0% | 0.48% | none |
| NH2/NCO | 1.14 | 0.65 | 0.43 | 0.21 | 0 |
| % NHNH groups | 0.90 | 0.52 | 0.34 | 0.17 | 0 |
| Viscosity at 25° C. (mPa · s) | 33 | 56 | 67 | 98 | 99 |
| % solids | 39.3 | 39.8 | 39.7 | 39.4 | 40.2 |
| pH | 7.40 | 7.55 | 7.35 | 7.21 | 7.20 |
| Particle size (nm) | 56 | 62 | 58 | 60 | 48 |

TABLE 8

Photo yellowing ($\Delta$b = b before cure − b just after cure) - Fourth series

| $\Delta$b at 1 mil thickness | Ex13 | Ex14 | Ex15 | Ex16 | Ex17-R |
|---|---|---|---|---|---|
|  | 1.55 | 1.8 | 1.9 | 2.05 | 2.1 |

The above shows that overall the compounds (iv) are preferentially used in an amount such that the —NH—NH— content is at least 0.2 wt %, relative to the total weight of compounds (A). Below this amount a 'delta' b below 2 was more difficult to obtain.

Pencil Hardness (Leneta and Glass)

Scratch resistance (steel wool on Leneta): the testis performed by scratching the coating with the steel wool for 5 double rubs. The results are rated visually and recorded in a 1-5 scale: 5=no scratch; 4=very light scratch; 3=moderate scratch; 2=strong scratch; 1=very strong scratch. A high value (5) is expected to provide the best protection against any deterioration of the coated object.

Stain resistance (Mustard) was measured on Leneta paper by applying 50 p of wet coating, drying and curing it. Mustard is put on the cured coating and protected with a watch glass. After a contact time of 1 hour the stain is wiped away, first dry and then with water and detergent. Visual evaluation of the coating surface is done, delta b* of the stain is measured and reported on a scale from 0 to 5 as follows: 5=No visible change; 4=Very slight change in color or gloss; 3=Slight change in color and/or gloss but the surface structure is not damaged; 2=Strong change in color and/or gloss but the surface structure is not damaged; 1=Strong marks and surface structure is damaged; 0=Surface structure completely damaged.

Gloss measurements: Throughout the invention and also here gloss measurements were done with a BYK Gardner micro TRI-gloss 20-60-85 gloss-meter in accordance with DIN EN ISO 2813.

The pendulum hardness (Persoz) measures the time (in seconds) for a pendulum with a given weight and geometry to amortize its oscillation amplitude between 2 defined angles. It is measured on glass plate (120 μm wet coating), on 3 places of the coating surface and the mean value is calculated. Elevated values are indicative of hard coatings. It follows ASTM D4466.

The water release was assessed by observing the visual aspect after 48 hours of non-pigmented coating made in the following conditions: 200 p wet layers were applied with a doctor blade on grey PVC 3 mm sheets. Water was evaporated from the coating during 6 minutes at 40° C. Subsequently coatings were exposed to UV radiations from a 80 Watt Hg lamp at a defined conveyer speed: 1×5 m/minute. Rating was on a scale from 5 to 0, wherein 5 stands for transparent coatings (very good water release properties) and 0 stands for white opaque coatings (very bad water release properties). According to the rating used 1 stands for very hazy/grey with white zones, 2 stands for very hazy/grey, 3 stands for hazy/grey, 4 stands for light hazy/light grey and 5 stands for transparent.

"Anfeuerung" covers the wetting of wood and the enhancement of the wooden structure. The test is performed by applying a coating on wood (sappelli), drying it and curing it by UV. A visual inspection is used to evaluate the warm wet look aspect, compared to a reference. Sappelli is chosen as it is a dark wood and appropriate to evidence whitening coming from a waterborne system. Rating is from "1" (best) to "5" (worst).

Adhesion (cross hatch tape): The adhesion on wood is assessed using the cross-cut test according to ISO 2409. 5 cuts of ~1 cm long and spaced by ~1 mm are made in the coating using a knife, followed by 5 similar cuts in the transversal direction. The adhesion was measured using an adhesive tape (Scotch®) firmly pressed on the cross-cut coating and removed rapidly; the damage to the cross-cut surface area of the coating due to adhesion loss is expressed in a 0-5 scale, 5=best.

TABLE 9

| Coating formulation | | | |
|---|---|---|---|
| Sample | C | D | Manufacturer |
| Example 3 | 97.0% | | Allnex |
| Comparative example 6-R | | 97.0% | Allnex |
| Additol VXW 6360 (1:1 w/water) | 1.0% | 1.0% | Allnex |
| Irgacure 500 | 1.5% | 1.5% | Ciba |

TABLE 10

| Coating evaluation | | | |
|---|---|---|---|
| | | Ex 3 | Ex 6-R |
| Pencil Hardness | Leneta | <6B | <6B |
| Pencil Hardness | Glass | 3H | 3H |
| Steel Wool Scratch (DR) | Leneta | 1 | 1 |
| Stain Test - Mustard (0-3) | Leneta | 3 | 3 |

TABLE 10-continued

| Coating evaluation | | | |
|---|---|---|---|
| | | Ex 3 | Ex 6-R |
| Stain Test - Mustard (b*) | Leneta | 27 | 21 |
| Gloss - 20° (glu) | Leneta | 68 | 70 |
| Gloss - 60° (glu) | Leneta | 88 | 92 |
| Gloss - 85° (glu) | Leneta | 98 | 98 |
| Persoz Hardness (s) | Leneta | 241 | 286 |
| Water Release | Grey PVC | 3 | 5 |
| Anfeuerung | Wood | slightly wet look | good contrast |
| Cross Hatch Adhesion (0-5) | Wood | 5 | 5 |

The above shows that radiation curable compositions (I) of the invention do not deteriorate desired properties of a coating.

Preparation Example 4

A first double-wall glass reactor equipped with a mechanical stirrer, a thermocouple, a vapor condenser and a dropping funnel was charged at 40° C. with 180.96 g of 1,1'-methylene bis[4-isocyanatocyclohexane] (H12MD1), 188 g of acetone, 26.50 g dimethylolpropionic acid (DMPA), 0.99 g of trimethylolpropane (TMP), 222.22 g of polyadipate of neopentylglycol ($I_{OH}$ 58) and 6.90 g of ethyleneglycol (EG). The reaction mixture was completely homogenized and 0.15 g of Bismuth neodecanoate is added. The mixture was heated to 60° C. and reacted under reflux for 9 hours. A NCO titer of 0.72 meq./g was obtained. The prepolymer was further diluted with 30 g acetone and neutralized with 19.97 g of triethylamine. The prepolymer obtained had a solid content closed to 70%.

39.2 g of adipic dihydrazide (ADH) was dissolved in 715 g of water in a second reactor equipped in a same way as the first one. The content of the first reactor was added in the second one, in 20 minutes and let homogenize 30 minutes more. 0.35 g of BYK093 antifoaming agent was then added to the dispersion and acetone was stripped under vacuum at a T° of 50-55° C. until a residual of acetone content below 0.05% was obtained. Further 30 g of water were added in order to obtain a solid content of 38.87%. Dispersion obtained was a non-radiation curable PUD containing 2.83% —NH—NH— (expressed in solids weight).

This PU dispersion had a viscosity of 635 mPa·s, pH of 8.04 and particle size of 47 nm Comparative Example 18R Ucecoat 7849, commercial UV PUD not made according to the present disclosure.

Main characteristics 34.8% NV, 49 mPa·s, particle size 72 nm

Example 19

100 p of Ucecoat 7849 was physically blended with 38.4 p of the PUD of preparation example 4 giving a solids ratio of 70% Uc7849/30% prepa ex 4 and 0.85% NHNH groups (expressed on the total solids of the blend)

Example 20

100 p of Ucecoat 7849 was physically blended with 89.5 p of the PUD of preparation example 4 giving a solids ratio of 50% Uc7849/50% prepa ex 4 and 1.42% NHNH groups (expressed on the total solids of the blend)

Preparation Example 5

A first double-wall glass reactor equipped with a mechanical stirrer, a thermocouple, a vapor condenser and a dropping funnel was charged at 40° C. with 180.96 g of Isophorone diisocyanate (IPDI), 234.08 g of Polycaprolactone diol Mw550 ($I_{OH}$ 203) and 0.09 g of triphenylphosphite. The reaction mixture was completely homogenized and 0.02 g of dibutyltinlaurate (DBTL) is added. The mixture was heated progressively in 30 min to 90° C. and reacted for 1 hour. A NCO titer of 1.93 meq./g was obtained. A blend of 204.8 g tripropyleneglycoldiacrylate (TPGDA), 106.9 g of Hydroxyethylacrylate (HEA), 0.03 g of hydroquinone and 0.33 g of dibutyltinlaurate (DBTL) was fed in 2 hours to the reactor and the mass temperature maintained between 85 and 95° C. After 30 min, the temperature was decreased to 60° C. The NCO titer obtained at this stage was 0.26 meq./g. 26.44 g of sebacic acid dihydrazide was added to the reactor in 10 minutes. 20 min after the feeding, a NCO titer of 0.02 meq./g was obtained. The final product had a viscosity of 3160 mPa·s at 60° C. This sample contained 0.86% NHNH groups by weight.

Preparation Example 6

A first double-wall glass reactor equipped with a mechanical stirrer, a thermocouple, a vapor condenser and a dropping funnel was charged at 40° C. with 180.96 g of Isophorone diisocyanate (IPDI), 291.82 g of Polycaprolactone diol Mw550 ($I_{OH}$ 203) and 0.09 g of triphenylphosphite. The reaction mixture was completely homogenized and 0.02 g of dibutyltinlaurate (DBTL) was added. The mixture was heated progressively in 30 min to 90° C. and reacted for 1 hour. A NCO titer of 1.93 meq./g was obtained. A blend of 204.8 g tripropyleneglycoldiacrylate (TPGDA), 1116.39 g of Hydroxyethylacrylate (HEA), 0.03 g of hydroquinone and 0.33 g of dibutyltinlaurate (DBTL) was fed in 2 hours to the reactor and the mass temperature was maintained between 85 and 95° C. Two hour after the feeding, a NCO titer of 0.10 meq./g was obtained. The final product had a viscosity of 660 mPa·s at 60° C.

Example 21

A double-wall stainless steel vessel connected with a heated bath at 60'C was charged with 51.9 g of urethane acrylate of preparation example 5, 5.2 g of MAXEMUL 7101 and 3.9 g of DOWANOL DPM. The blend was stirred at a rotation speed of 100 rpm with a cowless propeller having a diameter of 60 mm until the temperature reached 60'C. The mixture was then stirred at a rotation speed of 2000 rpm while 16 g of water at room temperature was added at a constant flow rate during about 5 minutes using a peristaltic pump to reach a solid content of ca. 74%. A phase inversion point corresponding to a maximum of the viscosity was observed and the mixture was further sheared at a rotation speed of 2000 rpm for an additional period of 20 min at a constant temperature of 60'C. An additional quantity of 23 g of water was then added to the mixture at a constant flow rate during about 5 minutes, while the cowless rotation speed was progressively decreased to 200 rpm and the temperature decreased to room temperature. The final emulsion had a solid content of ca. 57%, particle size in the range of 700 nm and it was stable at least 3 days at room temperature.

Comparative Example 22R

This comparative example was prepared like the example 21 but preparation example 6 was used in place of preparation example 5. The final emulsion had a solid content of ca. 57%, particle size in the range of 700 nm and it was stable at least 3 days at room temperature.

This comparative example did not contain any NHNH groups.

TABLE 11

Improvement of the photo yellowing of an UV PUD by formulation with a non-radiation curable polyurethane dispersion containing hydrazide groups

|  | Ex 18-R | Ex 19 | Ex 20 |
| --- | --- | --- | --- |
| Δb at 1 mil thickness | 2.06 | 1.77 | 1.62 |
| % of prepa ex 4 | 0 | 30% | 50% |
| % NHNH groups on dry solids | 0 | 0.85% | 1.42% |

Decrease of photo-yellowing is obtained by formulation of a commercial UV PUD (UV PUD formulation not made according to this invention) with non-radiation curable polyurethane dispersion in which hydrazide as incorporated.

TABLE 12

Improvement of the photo yellowing of urethane acrylate emulsions (curing made in two UV exposure conditions)

|  | Ex 21 | Ex 22-R |
| --- | --- | --- |
| Δb at 1 mil thickness |  |  |
| 1154 mJ/cm$^2$ | 1.50 | 2.70 |
| 2645 mJ/cm$^2$ | 1.58 | 2.20 |
| % NHNH groups on dry solids | 0.66% | 0 |

The invention claimed is:

1. A radiation curable aqueous composition (I) with reduced photo-yellowing, said composition comprising
water, and
at least one saturated carboxylic acid hydrazide-containing compound (H1) and at least one ethylenically unsaturated compound (EC) and/or
at least one ethylenically unsaturated carboxylic acid hydrazide-containing compound (H2),
wherein the saturated carboxylic acid hydrazide-containing compound (H1) is prepared from:
(i) at least one compound containing free isocyanate groups, and
(iv) at least one carboxylic acid hydrazide compound,
wherein the ethylenically unsaturated carboxylic acid hydrazide-containing compound (H2) is prepared from:
(i) at least one compound containing free isocyanate groups,
(ii) at least one ethylenically unsaturated compound containing at least one group capable of reacting with an isocyanate and further at least one ethylenically unsaturated group, and
(iv) at least one carboxylic acid hydrazide compound, and
wherein the amount of carboxylic acid hydrazides compound (iv) used for the synthesis of the ethylenically unsaturated carboxylic acid hydrazide-containing compound (H2) or the saturated carboxylic acid hydrazide-containing compound (H1), expressed in % wt of active —NH—NH— groups relative to the total weight of compounds (H2), (H1), and (EC) is higher than 0.2 wt %, thereby forming a carboxylic acid hydrazide-containing compound (H) containing at least one —C(=O)NH—NH—C(=O)—NH— linkage.

2. The radiation curable aqueous composition (I) of claim 1, wherein the carboxylic acid hydrazide-containing compound (H) is provided in the form of an additive and/or in the form of a polymeric resin that, optionally, contains one or more ethylenically unsaturated groups.

3. The radiation curable aqueous composition (I) of claim 1, wherein the ethylenically unsaturated carboxylic acid hydrazide-containing compound (H2) comprises one or more compounds (A1) that is prepared from:
(i) at least one compound containing free isocyanate groups,
(ii) at least one ethylenically unsaturated compound containing at least one group capable of reacting with an isocyanate and further at least one ethylenically unsaturated group,
(iii-1) at least one compound containing at least one group capable of reacting with isocyanate groups and further at least one hydrophilic group capable of rendering the compound (A) dispersible or soluble in water either directly or after the reaction with a neutralizing agent to provide a salt,
(iv) at least one carboxylic acid hydrazide compound, and
(v) optionally, at least one compound containing at least one group capable of reacting with isocyanate groups but no ethylenically unsaturated groups.

4. The radiation curable aqueous composition (I) of claim 1, wherein the ethylenically unsaturated carboxylic acid hydrazide-containing compound (H2) comprises one or more compounds (A2) that is prepared from:
(iv) at least one compound containing at least two free isocyanate groups,
(v) at least one ethylenically unsaturated compound containing at least one group capable of reacting with an isocyanate and further at least one ethylenically unsaturated group,
(iii-2) at least one polymer of a weight average molecular weight (Mw) higher than 2,000 containing at least one group capable of reacting with isocyanate groups and further at least one hydrophilic group capable of rendering the compound (A) dispersible or soluble in water either directly or after the reaction with a neutralizing agent to provide a salt, and
(iv) at least one carboxylic acid hydrazide compound.

5. The radiation curable aqueous composition (I) of claim 1, wherein the ethylenically unsaturated carboxylic acid hydrazide-containing compound (H2) comprises one or more compounds (A3) that is prepared from:
(iv) at least one compound containing free isocyanate groups,
(vii) at least one ethylenically unsaturated compound containing at least one group capable of reacting with an isocyanate and further at least one ethylenically unsaturated group,
(vii) optionally, at least one compound containing one group capable of reacting with isocyanate groups and further at least one hydrophilic group acting as co-dispersant of the compound (A) in water either directly or after the reaction with a neutralizing agent to provide a salt,
(ix) at least one carboxylic acid hydrazide compound,
(x) optionally, at least one compound containing at least one group capable of reacting with isocyanate groups but no ethylenically unsaturated groups, and the radiation curable aqueous composition (I) further comprises at least one external emulsifier (B) and optionally at least one co-solvent (D).

6. The radiation curable aqueous composition (I) of claim 1, further comprising at least one external emulsifier (B) and optionally at least one co-solvent (D).

7. The radiation curable aqueous composition of claim 1, wherein the compound containing free isocyanate groups (i) is an aliphatic and/or cycloaliphatic polyisocyanate.

8. The radiation curable aqueous composition of claim 1, wherein the carboxylic acid hydrazide compound (iv) is selected from hydrazides that have a solubility in demineralized water of at least 2 g/l and/or from hydrazides that have a solubility in basic water of at least 2 g/l.

9. The radiation curable aqueous composition of claim 1, wherein the carboxylic acid hydrazide compound (iv) is one or more selected from the group consisting of adipic acid dihydrazide, sebacic acid dihydrazide, icosanedioic acid dihydrazide, valine dihydrazide, and valeric hydrazide.

10. The radiation curable aqueous composition of claim 1, wherein the molar ratio of NH2 groups provided by the carboxylic acid hydrazide compound (iv) over the residual NCO groups obtained after reaction of the compounds (i) to (iii) and optionally (v) is more than 0.4.

11. The radiation curable aqueous composition of claim 1, wherein the amount of carboxylic acid hydrazide compound (iv) used for the synthesis of compounds the ethylenically unsaturated carboxylic acid hydrazide-containing compound (H2) or the saturated carboxylic acid hydrazide-containing compound (H1), expressed in % wt of active —NH—NH— groups relative to the total weight of compounds (H2), (H1), and (EC) is not higher than 2 wt %.

12. The radiation curable aqueous composition (I) of claim 1, further comprising at least one ethylenically unsaturated compound (C) different from the ethylenically unsaturated carboxylic acid hydrazide-containing compound (H2) and, where present, (EC) is an unsaturated compound (C) is selected from the group consisting of urethane (meth)acrylates, epoxy (meth)acrylates, polyester (meth)acrylates and/or (meth)acrylic (meth)acrylates, and self-water-dispersible polyurethane (meth)acrylate.

13. The radiation curable aqueous composition of claim 12, wherein the unsaturated compound (C) is prepared from the same building blocks as the ethylenically unsaturated carboxylic acid hydrazide-containing compound (H2) with the exception that the compound (C) does not contain any compound (iv) building blocks.

14. The radiation curable aqueous composition of claim 1 further comprising at least one of the following compounds:
4) at least one photo-initiator,
5) at least one additive that is selected from the group consisting of UV stabilizers and UV absorbers,
6) at least one hydrazine and/or at least one hydrazide compound different from the ethylenically unsaturated carboxylic acid hydrazide-containing compound (H2).

15. A coating composition, paint, ink, varnish or adhesive prepared from a radiation curable aqueous composition according to claim 1.

16. A process for preparing a coating with a reduced photo-yellowing, said process comprising the steps of:
(a) providing a radiation curable aqueous composition (I) according to claim 1, (b) applying said composition onto a surface to form a dry layer that is from 2 to 200 μm thick, and (c) irradiating the surface with actinic radiation.

17. The coating obtained via the process according to claim 16, wherein the photo-yellowing value is below 2, this photo-yellowing value being defined as the difference between the 'b' value according to CIELAB scale measured 20 minutes before cure and the 'b' value measured 10 minutes after cure for a 25 μm thick dry layer cured with a Hg lamp with an energy of 1,100 mJ/cm2.

18. A method of reducing photo-yellowing comprising providing the radiation curable aqueous composition (I) of claim 1 with a radiation curable ethylenically unsaturated compound (C) not containing any compounds (iv) in its backbone, wherein photo-yellowing of the radiation curable ethylenically unsaturated compound (C) not containing any compounds (iv) in its backbone is reduced.

* * * * *